(12) United States Patent
Gorokhov et al.

(10) Patent No.: US 8,582,592 B2
(45) Date of Patent: Nov. 12, 2013

(54) WIRELESS RESOURCE ALLOCATION METHODS AND APPARATUS

(75) Inventors: Alexei Gorokhov, San Diego, CA (US); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1509 days.

(21) Appl. No.: 11/766,325

(22) Filed: Jun. 21, 2007

(65) Prior Publication Data

US 2008/0056183 A1 Mar. 6, 2008

Related U.S. Application Data

(60) Provisional application No. 60/816,281, filed on Jun. 23, 2006, provisional application No. 60/815,664, filed on Jun. 21, 2006, provisional application No. 60/815,733, filed on Jun. 21, 2006.

(51) Int. Cl.
| | |
|---|---|
| H04L 12/28 | (2006.01) |
| H04W 4/00 | (2009.01) |
| H04W 72/00 | (2009.01) |
| H04B 1/02 | (2006.01) |
| H04B 7/216 | (2006.01) |

(52) U.S. Cl.
USPC ........... 370/431; 370/329; 370/335; 370/341; 455/91; 455/450

(58) Field of Classification Search
USPC ................. 370/329, 236, 342, 335, 341, 431; 455/91, 450
See application file for complete search history.

(56) References Cited

U.S. PATENT DOCUMENTS

| | | |
|---|---|---|
| 6,377,809 B1 | 4/2002 | Rezaiifar et al. |
| 6,606,485 B1 | 8/2003 | Chen et al. |

(Continued)

FOREIGN PATENT DOCUMENTS

| | | |
|---|---|---|
| EP | 1359774 | 11/2003 |
| EP | 1359774 | 6/2006 |

(Continued)

OTHER PUBLICATIONS

Bellec M Et Al: "A PHY/MAC Proposal for IEEE 802.22 WRAN Systems—Part 1: The PHY—doc.: IEEE 802.22-06/0004r0" Internet Citation, [online] Jan. 11, 2006, XP007902868 Retrieved from the Internet: URL:http://www.ieee802.org/22/Meeting_documents/2006_Jan/index.html> [retrieved on Sep. 3, 2007] p. 15, section Spuerframe control header.

(Continued)

*Primary Examiner* — Opiribo Georgewill
(74) *Attorney, Agent, or Firm* — Donald C. Kordich

(57) ABSTRACT

Methods and apparatus for assigning and using resources corresponding to discontinuous portions of bandwidth are described. A single assignment may be used to assign multiple disjoint portions of bandwidth to be used by a wireless terminal, e.g., at the same time, as an uplink or downlink band. Different portions of bandwidth allocated to a terminal may have different numbers and/or locations of guard subcarriers with relevant guard subcarrier information being communicated to the wireless terminal in a broadcast signal or being determined from stored information. The disjoint portions of bandwidth allocated for use to a terminal may be separated by a carrier band, e.g., 1.25 MHz or more, which is not available for use, e.g., because it is owned by another service provider. Some embodiments are implemented using OFDM signals wherein a wireless terminal may generate or receive an OFDM symbol including subcarriers, e.g., tones corresponding to the different discontinuous portions but not the bandwidth separating the discontinuous portions.

74 Claims, 12 Drawing Sheets

(56) References Cited

U.S. PATENT DOCUMENTS

| | | | |
|---|---|---|---|
| 6,891,812 | B2 | 5/2005 | Bender |
| 6,915,473 | B2 | 7/2005 | Bolourchi et al. |
| 6,928,066 | B1 | 8/2005 | Moon et al. |
| 7,016,319 | B2 | 3/2006 | Baum et al. |
| 7,042,957 | B1 | 5/2006 | Zirwas |
| 7,120,166 | B2 | 10/2006 | McFarland et al. |
| 7,227,854 | B2 | 6/2007 | Kim et al. |
| 8,374,200 | B2 | 2/2013 | Gorokhov et al. |
| 2002/0015405 | A1 | 2/2002 | Sepponen et al. |
| 2002/0126641 | A1 | 9/2002 | Bender |
| 2002/0138721 | A1 | 9/2002 | Kwon et al. |
| 2002/0170013 | A1 | 11/2002 | Bolourchi et al. |
| 2004/0058687 | A1 | 3/2004 | Kim et al. |
| 2004/0090933 | A1 | 5/2004 | McFarland et al. |
| 2004/0190482 | A1 | 9/2004 | Baum et al. |
| 2005/0094615 | A1 | 5/2005 | Kim et al. |
| 2005/0163265 | A1 | 7/2005 | Gupta |
| 2005/0195758 | A1 | 9/2005 | Chitrapu |
| 2005/0286482 | A1 | 12/2005 | Rajkotia |
| 2006/0002451 | A1 | 1/2006 | Fukuta et al. |
| 2006/0018258 | A1* | 1/2006 | Teague et al. ............... 370/236 |
| 2006/0024541 | A1 | 2/2006 | Weiss et al. |
| 2006/0025079 | A1 | 2/2006 | Sutskover et al. |
| 2006/0188003 | A1* | 8/2006 | Larsson ................... 375/130 |
| 2006/0221810 | A1 | 10/2006 | Vrcelj et al. |
| 2006/0256708 | A1 | 11/2006 | Wang et al. |
| 2007/0047495 | A1 | 3/2007 | Ji et al. |
| 2007/0201398 | A1* | 8/2007 | Yang et al. ................ 370/329 |
| 2007/0202816 | A1* | 8/2007 | Zheng ....................... 455/91 |
| 2007/0297379 | A1 | 12/2007 | Gorokhov et al. |
| 2008/0043879 | A1 | 2/2008 | Gorokhov et al. |
| 2008/0056183 | A1 | 3/2008 | Gorokhov et al. |
| 2011/0019770 | A1 | 1/2011 | Gorokhov et al. |
| 2011/0255522 | A9 | 10/2011 | Gorokhov et al. |

FOREIGN PATENT DOCUMENTS

| | | |
|---|---|---|
| JP | 2005102210 A | 4/2005 |
| JP | 2005102210 A | 4/2005 |
| KR | 20020034651 | 5/2002 |
| KR | 20020034818 | 9/2002 |
| RU | 2154901 | 8/2000 |
| RU | 2185031 | 7/2002 |
| RU | 2207723 C1 | 6/2003 |
| RU | 2207723 C1 | 6/2003 |
| RU | 2238611 C1 | 10/2004 |
| RU | 2238611 C1 | 10/2004 |
| WO | 2005104589 | 11/2005 |
| WO | 2005104589 A1 | 11/2005 |
| WO | 2005104689 A2 | 11/2005 |
| WO | WO2005104689 A2 | 11/2005 |

OTHER PUBLICATIONS

Jondral FK Et Al.: "Spectrum pooling: an innovative strategy for the enhancement of spectrum efficiency" IEEE Communications Magazine, IEEE Service Center, Piscataway, US. vol. 42, No. 3, Mar. 2004.
Khalona R. (Nextwave Broadband): "Next Broadband WRAN proposal outline" [online] Nov. 7, 2005, XP002458664 Retrieved from the Internet: URL http://www.ieee802.org/22/Meeting_documents/2005_Nov_22-05-0091-00-0000_Nextwave_proposal_outline.doc> [retrieved on Oct. 26, 2007] p. 13, paragraph 1.
Poston J D et al.: "Discontiguous OFDM considerations for dynamic spectrum access in idle TV channels" New Frontiers in Dynamic Spectrum Access Networks, 2005. Dyspan 20056. 2005 First IEEE International Symposium on Baltimore, MD, USA Nov. 8-11, 2005, Piscataway, NJ, USA IEEE, Nov. 8, 2005, pp. 607-610, XP010855159 ISBN: 1-4244-0013-9 *section IV * abstract.
Tomcik, Jim. "MBFDD and MBTDD Wideband Mode: Technology Overview", IEEE 802.20 Working Group on Mobile Broadband Wireless Access, IEEE c802.20-05/68r1, Jan. 6, 2006, pp. 1-109.
Tomcik, Jim, "QFDD Technology Overview Presentation", IEEE Working Group on Mobiie Broadband Wireless Access, IEEE c802.20-05-59r1, Nov. 15, 2005, Slides 1-73.
Lucent Technologies: "Comparison of schemes for UE Specific CRC" 3GPP Draft; R1-02-0076 UESPCRC, 3rd Generation % Partnership Project (3GPP), Mobile Competence Centre ; 650, Route Des Lucioles ; F-06921 Sophia-Antipolis Cedex ; France, vol. RAN WG1, No. Espoo, Finland; 20020112, Jan. 12, 2002, XP050095659 [retrieved on Jan. 21, 2002.
Rapporteur: "TR 25.858 v 0.1.2" 3GPP Draft, R1-01-1343-REV1, 3rd Generation Partnership Project (3GPP), Mobile Competence Centre ; 650, Route Des Lucioles ; F-06921 Sophia-Antipolis Cedex : France, vol. RAN WG1, No. Espoo, Finland; 20020106, Jan. 6, 2002, XP050095584.
Tomcik, T.: "QTDD Performance Report 2," IEEE C802.20-05/88, IEEE 802.20 Working Group on Mobile Broadband Wireless Access, <http://ieee802.org/20/>, pp. 1-56, XP002386798 (Nov. 15, 2005).
Bellec M., et al., "A PHY/MAC Proposal for IEEE 802.22 WRAN Systems—Part 1: The PHY," doc.: IEEE 802.22-06/0004r0 Internet Citation, [online] Jan. 11, 2006, XP007902868, pp. 1-34.
Chellali A et al., "Computational reduction during idle transmission in DSL modems", Acoustics, Speech and Signal Processing 1998. Proceedings of the 1998 IEEE Internationla Conference on Seattle, WA, May 12-15, 1998, vol. 6, pp. 3441-3444.
Choi S.H. et al., "Method and apparatus for confirming multiple frame structure and indicating transmission diversity through phase modulation of forward pilot time slot in nb-tdd dmna communication system", Database WPI, May 9, 2002, pp. 1-3.
Ericsson: "Discussion on HS-SCCH misdetection performance and provision of a UE-Id on HS-DSCH" 3GPP Draft; R2-030337, 3rd Generation Partnership Project (3GPP), Mobile Competence Centre; 650, Route Des Lucioles; F-06921 Sophia-Antipolis Cedex; France, vol. RAN WG2, No. Sophia Antipolis, France; 20030214, Feb. 14, 2003, XP050122984 [retrieved on Feb. 14, 2003].
Ericsson: "Discussion on HS-SCCH misdetection probability" 3GPP Draft; R1-030351, 3rd Generation Partnership Project (3GPP), Mobile Competence Centre; 650, Route Deslucioles ; F-06921 Sophia-Antipolis Ceoex ; France, vol. RAN WG1, No. Tokyo; 20030221, Feb. 21, 2003, XP050097449 [retrieved on Feb. 21, 2003].
ETSI 3GPP TS 25.222 "3rd Generation Partnership Project; Technical Specification Group Radio Access Network; Multiplexing and channel coding (TDD)," Release 7, Mar. 2006.
International Preliminary Report on Patentability—PCT/US07/071744, The International Bureau of WIPO—Geneva, Switzerland, Dec. 22, 2008.
International Preliminary Report on Patentability—PCT/US07/071821, The International Bureau of WIPO—Geneva, Switzerland, Dec. 22, 2008.
International Search Report—PCT/US07/071744, International Search Authority—European Patent Office—Nov. 12, 2007.
International Search Report—PCT/US07/071821—International Search Authority, European Patent Office—Feb. 20, 2008.
International Search Report—PCT/US07/072049, International Search Authority, European Patent Office—Nov. 13, 2007.
Jondral FK., et al., "Spectrum pooling: an innovative strategy for the enhancement of spectrum efficiency" IEEE Communications Magazine, IEEE Service Center, Piscataway, US, vol. 42, No. 3, Mar. 2004, pp. S8-S14.
Khalona R. (Nextwave Broadband): "Next Broadband WRAN proposal outline" doc.: IEEE 802.22-05/0091r0, [online] Nov. 7, 2005, XP002456664, pp. 1-19.
Lucent Technologies: "Comparison of schemes for UE Specific CRC" 3GPP Draft; R1-02-0076 UESPCRC, 3rd Generation % Partnership Project (3GPP), Mobile Competence Centre ; 650, Route Des Lucioles ; F-06921 Sophia-Antipolis Cedex ; France, vol. RAN WG1, No. Espoo, Finland; 20020112, Jan. 12, 2002, XP050095659 [retrieved on Jan. 21, 2002.
MBFDD and MBTDD Wideband Mode: Technology Overview, IEEE C802.20-05/68r1, Jan. 6, 2006.
Poston J D et al.: "Discontiguous OFDM considerations for dynamic spectrum access in idle TV channels" New Frontiers in Dynamic Spectrum Access Networks, 2005. Dyspan 20056. 2005 First IEEE International Symposium on Baltimore, MD, USA Nov. 8-11, 2005, pp. 607-610.
Rapporteur: "TR 25.858 v 0.1.2" 3GPP Draft; R1-01-1343-REV1, 3rd Generation Partnership Project (3GPP), Mobile Competence

(56) References Cited

OTHER PUBLICATIONS

Centre ; 650, Route Des Lucioles ; F-06921 Sophia-Antipolis Cedex ; France, vol. RAN WG1, No. Espoo, Finland; 2002 01 06, Jan. 6, 2002, XP050095584.

Russian Explanatory Dictionary of Radio Electronics (P.K. Gorokhov, Moscow, 1993, p. 93).

Schaefer, D.J."Wide area adaptive spectrum applications", Military Communications Conference ,2001. MILCOM 2001.Communications for Network-Centric Operations: Creating the Information Force.IEEE, Oct. 31, 2001.

Siemens: "Improved UE Specific CRC Generation" Apr. 15, 2002, 3GPP Draft; R1-02-0493 (UE Specific CRC Generation), 3rd Generation Partnership Project (3GPP), Mobile Competence Centre; 650, Route Des Lucioles; F-06921 Sophia-Antipolis Cedex; France, XP050096088 [retrieved on Apr. 15, 2002].

Taiwan Search Report—TW096122420—TIPO—Mar. 17, 2012.

Taiwan Search Report—TW096122793—TIPO—Sep. 21, 2011.

Tomcik, Jim: "QFDD Technology Overview Presentation," IEEE 802.20 Working Group on Mobile Broadband Wireless Access, [Online] Nov. 15, 2005, pp. 1-73, XP002467626.

Tomcik T., "QTDD Performance Report 2," IEEE C802.20-05/88, IEEE 802.20 Working Group on Mobile Broadband Wireless Access, <http://ieee802.org/20/>, pp. 1-56, XP002386798 (Nov. 15, 2005).

Written Opinion—PCT/US07/071821—International Search Authority, European Patent Office—Feb. 20, 2008.

Written Opinion—PCT/US07/072049, International Search Authority, European Patent Office—Nov. 13, 2007.

Written Opinion—PCT/US2007/071744, International Search Authority, European Patent Office, Nov. 12, 2007.

\* cited by examiner

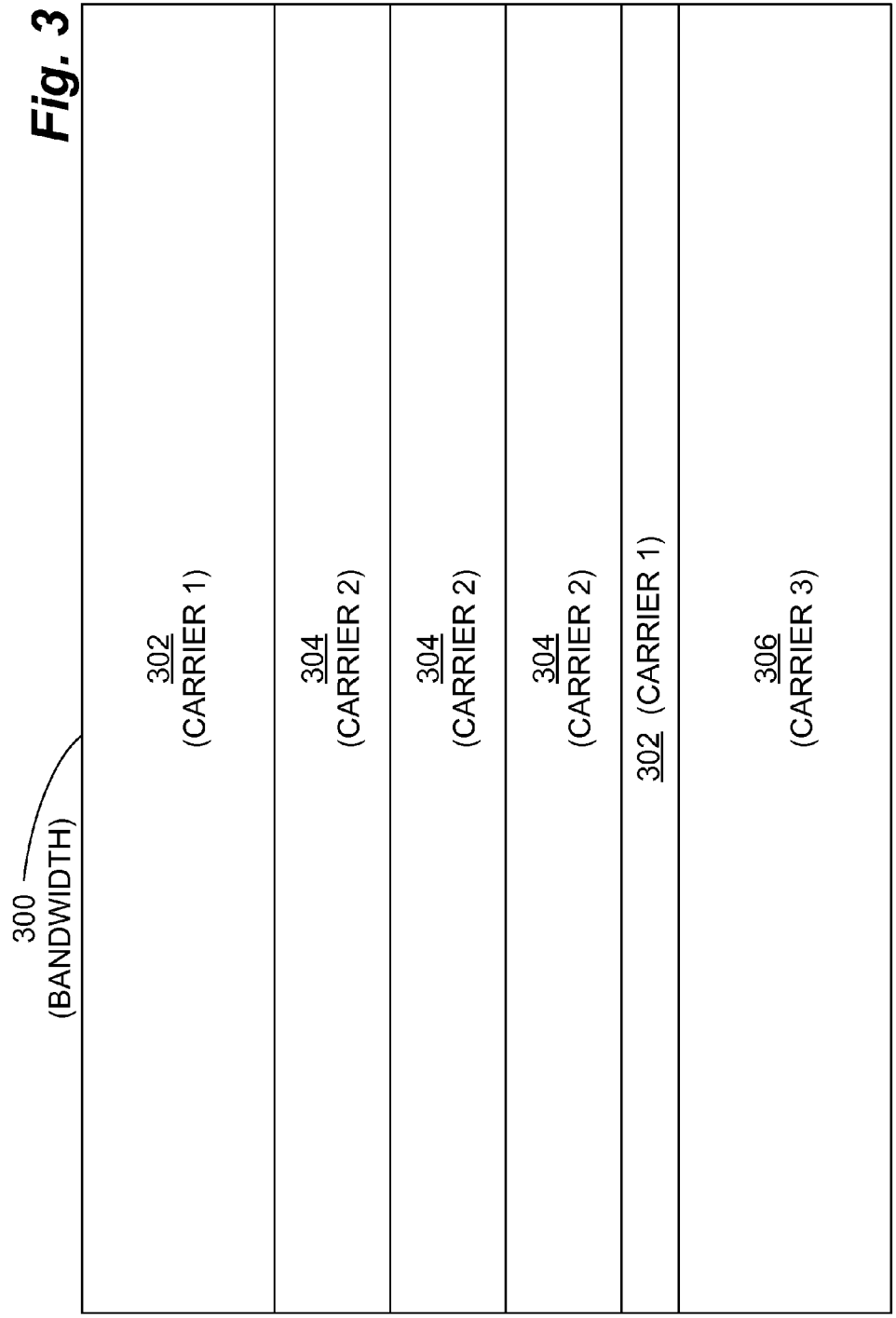

WIRELESS RESOURCE ALLOCATION METHODS AND APPARATUS

RELATED APPLICATIONS

The present application claims the benefit of U.S. Provisional Patent Application Ser. No. 60/816,281 filed on Jun. 23, 2006, titled "ULTRA-HIGH DATA RATE (UHDR) FOR MOBILE BROADBAND WIRELESS ACCESS"; U.S. Provisional Patent Application Ser. No. 60/815,664 filed on Jun. 21, 2006, titled "BANDWIDTH ALLOCATION FOR WIRELESS COMMUNICATION SYSTEM"; and U.S. Provisional Patent Application Ser. No. 60/815,733 filed on Jun. 21, 2006, titled "SUPERFRAME STRUCTURE FOR WIRELESS COMMUNICATION SYSTEM" each of which is hereby expressly incorporated by reference.

FIELD

Various embodiments are directed to wireless communication methods and apparatus, and more particularly, to allocation and/or use of resources.

BACKGROUND

Wireless communication systems have become a prevalent means by which a majority of people worldwide have come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

Wireless communication systems generally utilize different approaches to generate transmission resources in the form of channels. These systems may be code division multiplexing (CDM) systems, frequency division multiplexing (FDM) systems, and time division multiplexing (TDM) systems. One commonly utilized variant of FDM is orthogonal frequency division multiplexing (OFDM) that effectively partitions the overall system bandwidth into multiple orthogonal subcarriers. These subcarriers may also be referred to as tones, bins, and frequency channels. Each subcarrier can be modulated with data. With time division based techniques, each subcarrier can be used in all or a portion of sequential time slices or time slots. Each user may be provided with one or more time slot and subcarrier combinations for transmitting and receiving information in a defined burst period or frame. The hopping schemes may generally be a symbol rate hopping scheme or a block hopping scheme.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and/or code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams transmitted from the base station. Likewise, a mobile terminal can transmit data to the base station or another mobile terminal. In these systems the bandwidth and other system resources are assigned utilizing a scheduler.

As wireless systems have developed over time, service provides have acquired the right to use one or more frequency bands but not others to which they have not purchased the communications rights. This has resulted in cases where a service provider may own the right to use multiple discontinuous portions of bandwidth in a geographic region but be precluded from using bandwidth located between the discontinuous portions of bandwidth to which the service provider has acquired rights.

Discontinuous portions of bandwidth might be used individually, e.g., by one wireless terminal or base station communicating using one discontinuous portion of bandwidth at a time. However, from a frequency diversity and/or throughput perspective it may be desirable for a wireless terminal or base station to be able to use multiple discontinuous portions of bandwidth at the same time, e.g., to support communication in one or multiple directions. For example, in the case of a need to support high uplink or downlink data rates it might be desirable to be able to use multiple discontinuous portions of bandwidth, e.g., portions of bandwidth separated by another service providers carrier, to support communication in an uplink direction or a downlink direction depending on which direction had the need for a high data throughput.

In view of the above, it should be apparent that there is a need for methods and apparatus which would allow a base station and/or wireless terminals to use discontinuous portions of bandwidth without using portions of bandwidth in between the discontinuous bands. It would be desirable if at least some methods and apparatus were well suited for use where the discontinuous bands were separated by a bandwidth corresponding to the width of a service provider's carrier, e.g., 1.25 MHz or more in some cases.

SUMMARY

Methods and apparatus for assigning and using resources corresponding to discontinuous portions of bandwidth are described. A single assignment may be used to assign multiple disjoint portions of bandwidth to be used by a wireless terminal, e.g., at the same time, as an uplink or downlink band. Different portions of bandwidth allocated to a terminal may have different numbers and/or locations of guard subcarriers with relevant guard subcarrier information being communicated to the wireless terminal in a broadcast signal or being determined from stored information. The disjoint portions of bandwidth allocated for use to a terminal may be separated by a carrier band, e.g., 1.25 MHz or more, which is not available for use, e.g., because it is owned by another service provider. Some embodiments are implemented using OFDM signals wherein a wireless terminal may generate or receive an OFDM symbol including subcarriers, e.g., tones corresponding to the different discontinuous portions but not the bandwidth separating the discontinuous portions.

An exemplary method for assigning resources in a wireless communication system comprises: selecting a first wireless terminal to be assigned a communications resource; and assigning the first wireless terminal a resource including at least two discontinuous portions of bandwidth for a period of time separated by a portion of bandwidth not included in said resource. An exemplary communications apparatus for assigning resources in a wireless communication system comprises: a selection module for selecting a first wireless terminal to be assigned a communications resource; and a resource assignment module for assigning the first wireless terminal selected by said selection module a resource including at least two discontinuous portions of bandwidth for a period of time separated by a portion of bandwidth not included in said resource.

An exemplary method of operating a wireless terminal comprises: receiving a resource assignment message indicating assignment, for a period of time, to said wireless terminal of a resource including at least two discontinuous portions of bandwidth separated by a portion of bandwidth not included in said resource; and using said assigned resource to communicate with an access point. An exemplary wireless terminal comprises: a receiver module for receiving a resource assignment message indicating assignment, for a period of time, to said wireless terminal of a resource including at least two discontinuous portions of bandwidth separated by a portion of bandwidth not included in said resource; and at least one of: i) a symbol generation module for generating symbols corresponding to the allocated resource and ii) a symbol recovery module for recovering symbols corresponding to the allocated resource.

While various embodiments have been discussed in the summary above, it should be appreciated that not necessarily all embodiments include the same features and some of the features described above are not necessary but can be desirable in some embodiments. Numerous additional features, embodiments and benefits are discussed in the detailed description which follows.

BRIEF DESCRIPTION OF THE DRAWINGS

FIG. 3 illustrates aspects of a bandwidth deployment.

DETAILED DESCRIPTION

Figure 1:
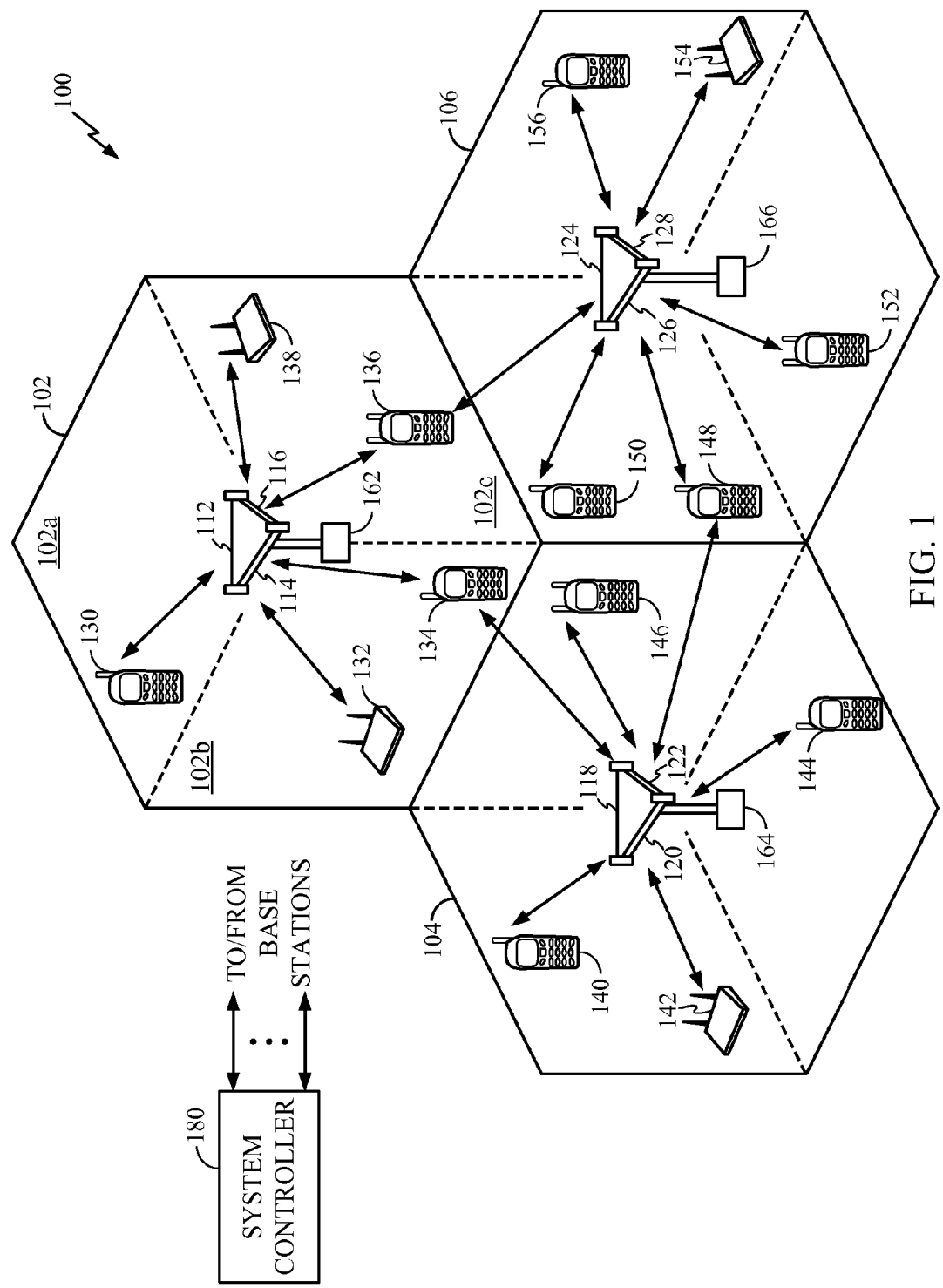
FIG. 1 illustrates aspects of a multiple access wireless communication system.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

Referring to FIG. 1, a multiple access wireless communication system 100 according to one embodiment is illustrated. A multiple access wireless communication system 100 includes multiple cells, e.g. cells 102, 104, and 106. In the embodiment of FIG. 1, each cell (102, 104, and 106) may include an access point (162, 164, 166), respectively, that includes multiple sectors. For example cell 102 includes a first sector 102a, a second sector 102b and a third sector 102c. The multiple sectors are formed by groups of antennas each responsible for communication with access terminals in a portion of the cell. In cell 102, antenna groups 112, 114, and 116 each correspond to a different sector. In cell 104, antenna groups 118, 120, and 122 each correspond to a different sector. In cell 106, antenna groups 124, 126, and 128 each correspond to a different sector.

Each cell includes several access terminals which are in communication with one or more sectors of each access point. For example, access terminals 130, 132, 134, 136 and 138 are in communication access point 162; access terminals 140, 142, 144, 146, 148 and 134 are in communication with access point 164; and access terminals 136, 148, 150, 152, 154 and 156 are in communication with access point 166.

Controller 180 is coupled to each of the cells 102, 104, and 106. Controller 180 may contain one or more connections to multiple networks, e.g. the Internet, other packet based networks, or circuit switched voice networks that provide information to, and from, the access terminals in communication with the cells of the multiple access wireless communication system 100. The controller 180 includes, or is coupled with, a scheduler that schedules transmission from and to access terminals. In other embodiments, the scheduler may reside in each individual cell, each sector of a cell, or a combination thereof.

Each of the sectors can operate utilizing one or more of a plurality of carriers. Each carrier is a portion of a larger bandwidth in which the system can operate, or is available for communication. A single sector utilizing one or more carriers may have multiple access terminals scheduled on each of the different carriers during any given time interval, e.g. frame or superframe. Further, one or more access terminals may be scheduled on multiple carriers simultaneously.

An access terminal may be scheduled in one carrier or more than one carrier according to its capabilities. These capabilities may be part of the session information that is generated when the access terminal attempts to acquire communication or that has been negotiated previously, may be part of the identification information that is transmitted by the access terminal, or be established according to any other approach. In certain aspects, the session information may comprise a session identification token that is generated by querying the access terminal or determining its capabilities through its transmissions.

As used herein, an access point may be a fixed station used for communicating with the terminals and may also be referred to as, and include some or all the functionality of, a base station, a Node B, or some other terminology. An access terminal may also be referred to as, and include some or all the functionality of, a user equipment (UE), a wireless communication device, terminal, a wireless terminal, a mobile station, a mobile node, a mobile or some other terminology.

It should be noted that while FIG. 1, depicts physical sectors, i.e. having different antenna groups for different sectors, other approaches may be utilized. For example, utilizing multiple fixed "beams" that each cover different areas of the cell in frequency space may be utilized in lieu of, or in combination with physical sectors.

Figure 2A:
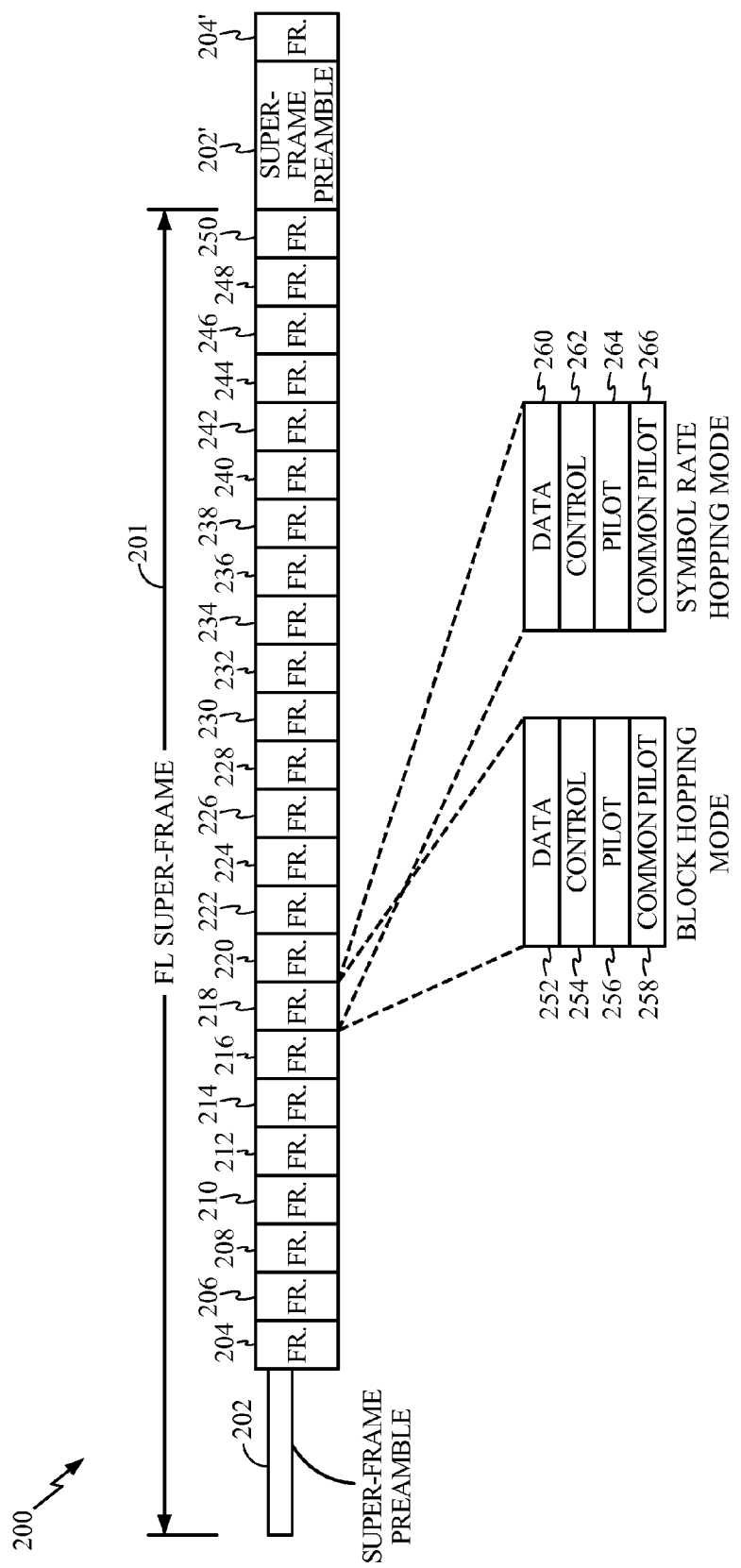
FIGS. 2A and 2B illustrate aspects of superframe structures for a multiple access wireless communication system.
Figure 2B:
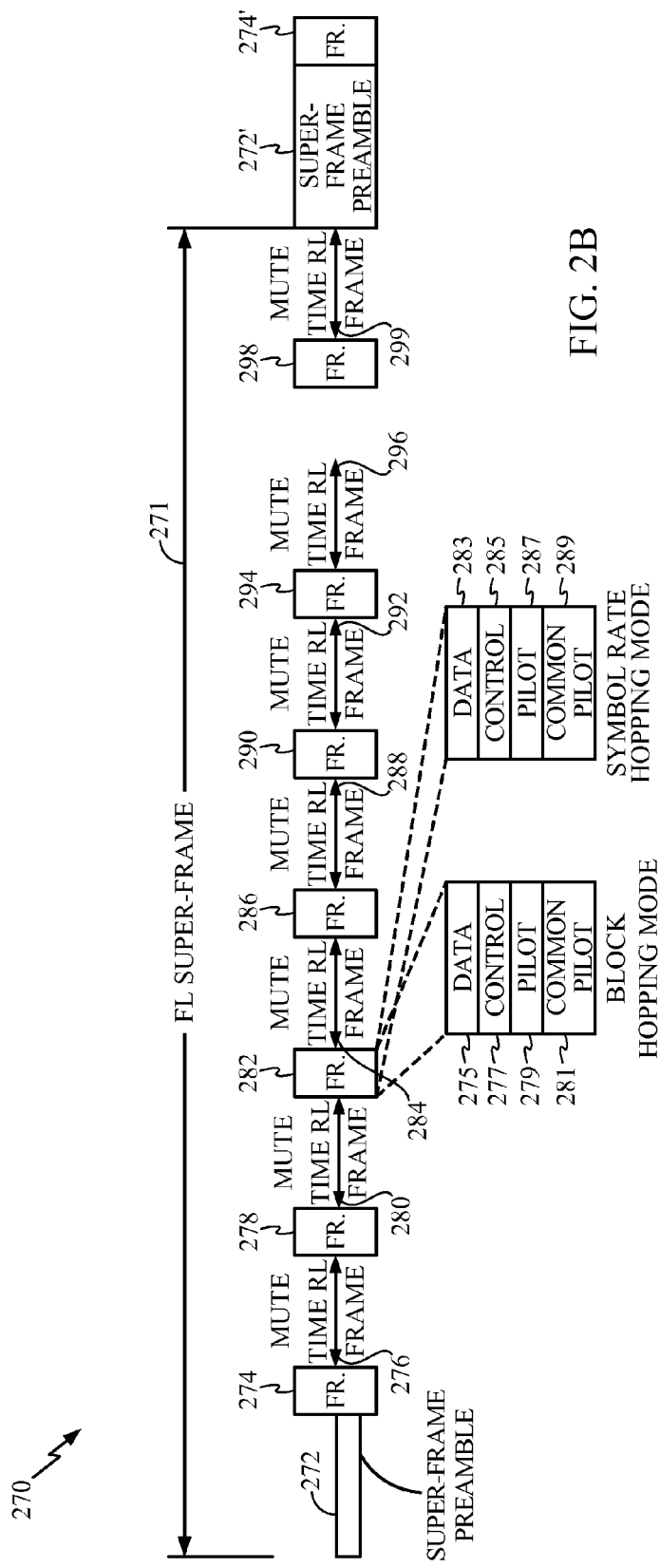

Referring to FIGS. 2A and 2B, aspects of superframe structures for a multiple access wireless communication system are illustrated. FIG. 2A illustrates aspects of superframe structures for a frequency division duplexed (FDD) multiple access wireless communication system, while FIG. 2B illustrates aspects of superframe structures for a time division duplexed (TDD) multiple access wireless communication system. The superframe preamble is transmitted at the beginning of each superframe, or may be interspersed within the superframe itself, e.g. a preamble and a midamble.

In both FIGS. 2A and 2B, the forward link transmission is divided into units of superframes. A superframe may comprise a superframe preamble followed by a series of frames. In an FDD system, the reverse link and the forward link transmission may occupy different frequency bandwidths so that transmissions on the links do not or for the most part do not, overlap on any frequency subcarriers. In a TDD system, N forward link frames and M reverse link frames define the number of sequential forward link and reverse link frames that may be continuously transmitted prior to allowing transmission of the opposite type of frame. It should be noted that the number of N and M may vary within a given superframe or between superframes.

Drawing 200 of FIG. 2A illustrates exemplary forward link super frame 201 which includes super frame preamable 202 followed by frames (204, 206, 208, 210, 212, 214, 216, 218, 220, 222, 224, 226, 228, 230, 232, 234, 236, 238, 240, 242, 244, 246, 248 and 250). An initial portion of another forward link superframe is illustrated including a super frame preamble 202' followed by a frame 204'. An exemplary frame, e.g., frame 218, in an exemplary block hopping mode includes a data portion 252, a control portion 254, a pilot portion 256, and a common pilot portion 258. An exemplary frame, e.g., frame 218, in an exemplary symbol rate hopping mode includes a data portion 260, a control portion 262, a pilot portion 264, and a common pilot portion 266.

Drawing 270 of FIG. 2B illustrates exemplary forward link super frame 271 which includes super frame preamable 272 followed by a sequence of frames utilized for forward link signaling and mute time intervals reserved for reverse link frames (frame 274, mute time 276, frame 278, mute time 280, frame 282, mute time 284, frame 286, mute time 288, frame 290, mute time 292, frame 294, mute time 296, . . . , frame 298, mute time 299. An initial portion of another forward link superframe is illustrated including a super frame preamble 272' followed by a frame 274'. An exemplary frame, e.g., frame 286, in an exemplary block hopping mode includes a data portion 275, a control portion 277, a pilot portion 279, and a common pilot portion 281. An exemplary frame, e.g., frame 286, in an exemplary symbol rate hopping mode includes a data portion 283, a control portion 285, a pilot portion 287, and a common pilot portion 289.

In both FDD and TDD systems each superframe may comprise a superframe preamble. In certain embodiments, the superframe preamble includes a pilot channel that includes pilots that may be used for channel estimation by access terminals, a broadcast channel that includes configuration information that the access terminal may utilize to demodulate the information contained in the forward link frame. Further acquisition information such as timing and other information sufficient for an access terminal to communicate and basic power control or offset information may also be included in the superframe preamble. In other cases, only some of the above and/or other information may be included in this superframe preamble.

In an aspect, the following information may be included in the superframe preamble: (i) a common pilot channel; (ii) a broadcast channel, including system and configuration information; (iii) an acquisition pilot channel, used to acquire timing and other information; and (iv) an other sector interference channel, including indicators from the sector of its measured interference with respect to other sectors.

Further, in certain aspects messages for channels in the superframe preamble may span multiple superframe preambles of different superframes. This may be utilized to improve decoding capability by allocating greater resources to certain high priority messages.

As shown in FIGS. 2A and 2B, the superframe preamble is followed by a sequence of frames. Each frame may include the same or a different number of OFDM symbols, which may constitute a number of subcarriers that may simultaneously be utilized for transmission over some defined period. Further, each frame may operate according to a symbol rate hopping mode, where one or more non-contiguous OFDM symbols are assigned to a user on a forward link or reverse link, or a block hopping mode, where users hop within a block of OFDM symbols. The actual blocks or OFDM symbols may or may not hop between frames.

FIG. 3 illustrates aspects of a bandwidth deployment. The bandwidth spanned by the superframe preamble may be, in one or more aspects, 1.25 MHz. In other aspects, it may be 2.5 MHz, 5 MHz, 20 MHz or some other bandwidth.

In FIG. 3, bandwidth 300 is divided into multiple carriers, a first carrier 302, a second carrier 304, and a third carrier 306. In certain aspects, acquisition, assignment, access, request, power control, pilot and reporting channels exist in each of the carriers. Further, each carrier may have the superframe preamble and forward link control channels and reverse link control channels. However, the actual encoding, transmission rates, message types and timing, resource allocations, overhead messaging, hop patterns and/or sequences, and other transmission and location parameters may vary from carrier to carrier. The format, transmission rate and hopping information may be signaled or otherwise available to an access terminal. This information may be available via separate control channels not associated with a specific carrier or may be provided via other means.

Some terminals, having a greater capability to demodulate signals, may be scheduled on two or more carriers within a superframe, in consecutive superframes, or during its communication session. These multi-carrier access terminals may be able to utilize different carriers for reverse link frames and forward link frames during a communication session or superframe, may be scheduled on different carriers in different superframes or during the communication session, or may be scheduled over frames that are substantially synchronous in time on different carriers. Such multi-carrier access terminals may be scheduled to provide load balancing of resources for a given carrier and provide statistical multiplexing gains throughout the total bandwidth.

In order to support multi-carrier access terminals operating across several carriers within a superframe, in consecutive superframes, or during its communication session several approaches may be provided. Firstly, the multi-carrier access terminals may demodulate the superframe preambles and forward link control channels for each of the carriers individually. In such a case, assignments, scheduling, power control and the like would be performed on a carrier by carrier basis.

In an aspect, each portion of a carrier that is disjoint is less than or equal to 1.25 MHz. The portions may be scattered over the total bandwidth of ≤20 MHz. Further, in some aspects the spacing between each portion of a same carrier is a multiple of 1.25 MHz. However, other spacing between and sizes of portions may be utilized depending on bandwidth deployments and the like.

In some aspects, one or more acquisition pilots carry the total FFT size, e.g. 1.25 MHz, 2.5 MHz, 5 MHz, 10 MHz, or 20 MHz, of a sector or access point. In some aspects, this information may be provided by the scrambling of acquisition pilots. In other aspects, this information may be carried in other portions of the superframe preamble.

In an aspect, the specification of non-contiguous allocations of one or more carriers may be provided on one or more overhead channels in a superframe preamble. For example, the information identifying a carrier, in the overhead channels or pilots, may include an allocation bit-map identifying the number and/or location of guard carriers within one or more portions of a carrier.

For the purposes of scheduling, resources in non-contiguous portions may be addressed in a single assignment to a user or users, or may be assigned independent portions of a carrier independently. For example, if channel trees are used for scheduling, resources may be contiguously mapped to channel tree nodes regardless of whether they are in contiguous portions or not. That is, each resource has a resource identification that is based upon the carrier and not its location in the bandwidth.

Figure 4:
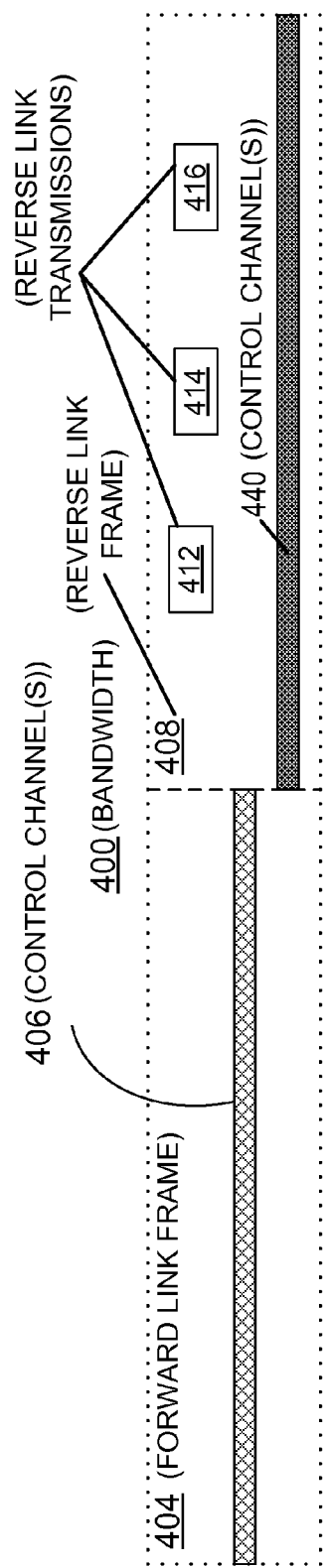
FIG. 4 illustrates aspects of frame structures for a multiple access wireless communication system.

Referring to FIG. 4, aspects of a channel structure for a multiple access wireless communication system are illustrated. A bandwidth 400, which is a virtual bandwidth containing multiple discontinuous portions, is available for communication according to system design parameters. The structure includes one or more forward link frames 404 and reverse link frames 408, each of which may be part of one or more superframes as discussed with respect to FIG. 2A and/or FIG. 2B.

Each forward link frame 404 includes control channels 406. Each of the control channels 406 may include information for functions related to, for example, acquisition; acknowledgements; forward link assignments for each access terminal, which may be different or the same for broadcast, multicast, and unicast message types, reverse link assignments for each access terminal; reverse link power control for each access terminal; and reverse link acknowledgements. It should be noted that more or fewer of such functions may be supported in control channels 406. Also, the control channels 406 may hop in each frame according to hopping sequences that are the same or different from hopping sequences assigned to data channels.

Each reverse link frame 408 includes a number of reverse link transmissions, e.g. 412, 414, and 416 from access terminals. In FIG. 4, a reverse link transmission is depicted as being a block, i.e. a group of contiguous OFDM symbols. It should be noted that symbol rate hopping, e.g. non-contiguous symbol blocks may also be utilized.

In addition, each reverse link frame 408 may include one more reverse link control channels 440, which may include feedback channels; pilot channels for reverse link channel estimation, and acknowledgment channels that may be included in the reverse link transmission 412, 414, 416. Each of the reverse link control channels 440 may include information for functions related to, for example, forward link and reverse link resource requests by each access terminal; channel information, e.g. channel quality information (CQI) for different types of transmission; and pilots from the access terminals that may be used by the access point for channel estimation purposes. It should be noted that more or fewer of such functions may be supported in control channel 440. Also, the reverse link control channels 440 may hop in each frame according to hopping sequences that are the same or different from hopping sequences assigned to data channels.

In certain aspects, to multiplex users on the reverse link control channels 440, one or more orthogonal codes, scrambling sequences, or the like may be utilized to separate each user and/or different types of information transmitted in the reverse link control channels 440. These orthogonal codes may be user specific or may be allocated by the access point to each access terminal per communication session or shorter period, e.g. per superframe.

Additionally, in certain aspects, some of the available subcarriers in an OFDM symbol may be designated as guard subcarriers and may not be modulated, i.e., no energy is transmitted on these subcarriers. The number of guard subcarriers in the superframe preamble and in each frame may be provided via one or more messages in the control channels 406 or superframe preamble.

Further, in some aspects, in order to reduce overhead transmission to a particular terminal, a packet may be jointly encoded for that access terminal, even if the symbols of the packets are to be transmitted over subcarriers. In this way a single cyclic redundancy check may be utilized for the packet and the transmissions that include symbols from these packets are not subject to overhead transmissions of cyclic redundancy checks.

It should be noted that the bandwidth 400 may comprise discontinuous subcarriers and need not be adjacent. In such aspects, the control channels may be limited to less than all of the portions of a carrier, randomly placed amongst the portions, or scheduled amongst the portions in some sort of deterministic fashion.

Figure 5A:
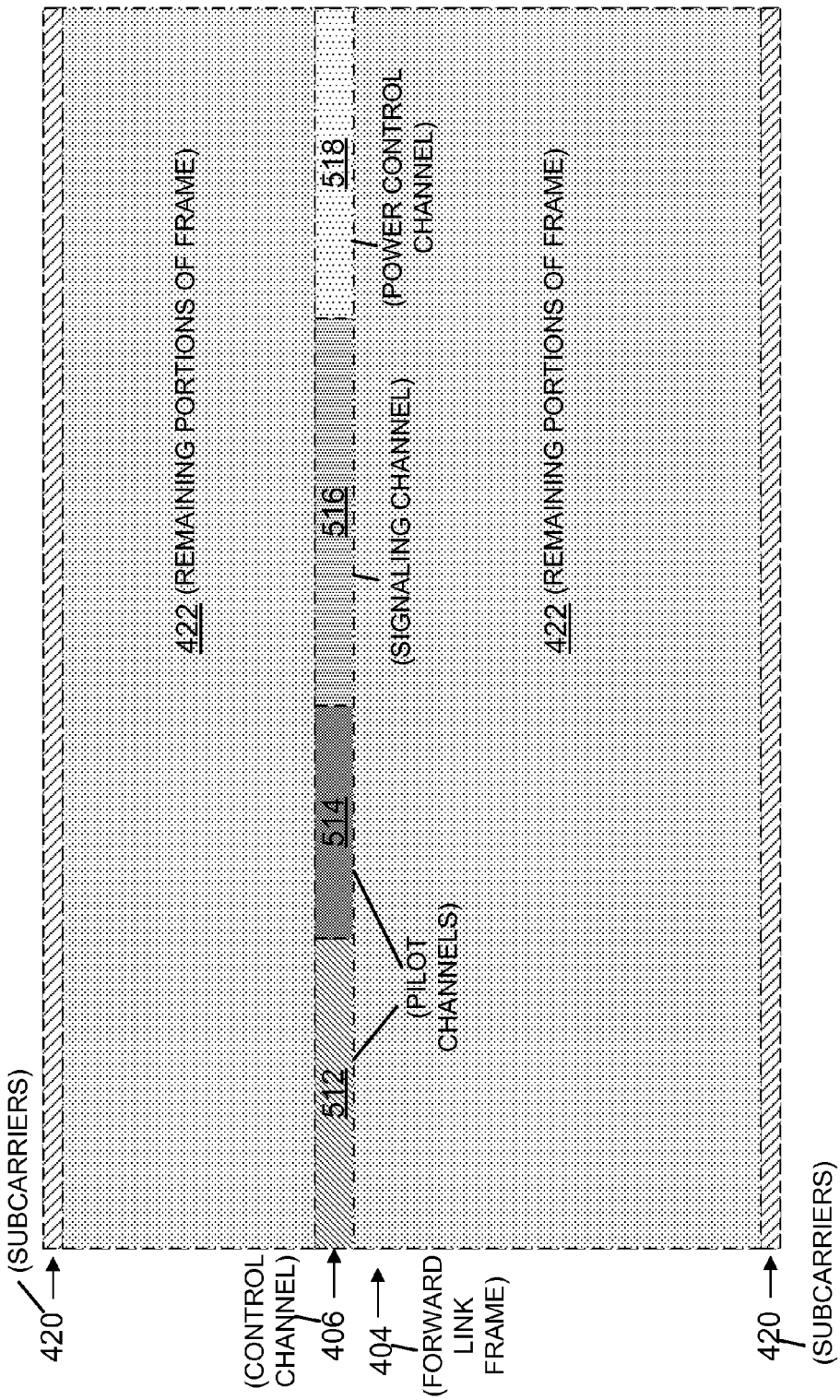
FIG. 5A illustrates aspects of a forward link frame for a multiple access wireless communication system.

Referring to FIG. 5A, aspects of a forward link frame for a multiple access wireless communication system are illustrated. As shown in FIG. 5A, each forward link frame 404 is further divided into two segments. The first, a control channel 406, which may or may not comprises a contiguous group of subcarriers, has a variable number of subcarriers assigned depending on the desired amount of control data and other considerations. The remaining portions 422 are generally available for data transmission. Control channel 406 may include one or more pilot channels 512 and 514. In symbol rate hopping mode, the pilot channels may be present on each of the OFDM symbols in each forward link frame, and need not be included in the control channel 406 in those instances. In both cases, a signaling channel 516 and a power control channel 518 may be present in the control channel 406, as depicted in FIG. 5A. The signaling channel 516 may include assignment, acknowledgement, and/or power references and adjustments for data, control, and pilot transmissions on the reverse link.

Power control channel 518 may carry information regarding interference generated at other sectors due to transmissions from access terminals of that sector. Also, in certain aspects, the subcarriers 420 at the edge of the entire bandwidth may function as quasi-guard subcarriers.

It should be noted that where multiple transmit antennas may be used to transmit for a sector, the different transmit antennas should have the same superframe timing (including the superframe index), OFDM symbol characteristics, and hop sequences.

It should be noted that, in some aspects, the control channel 512, 514, 516, 518 may comprise the same allocations as a data transmission, e.g. if data transmissions are block hopped then blocks of the same or different sizes may be allocated for the control channel.

Figure 5B:
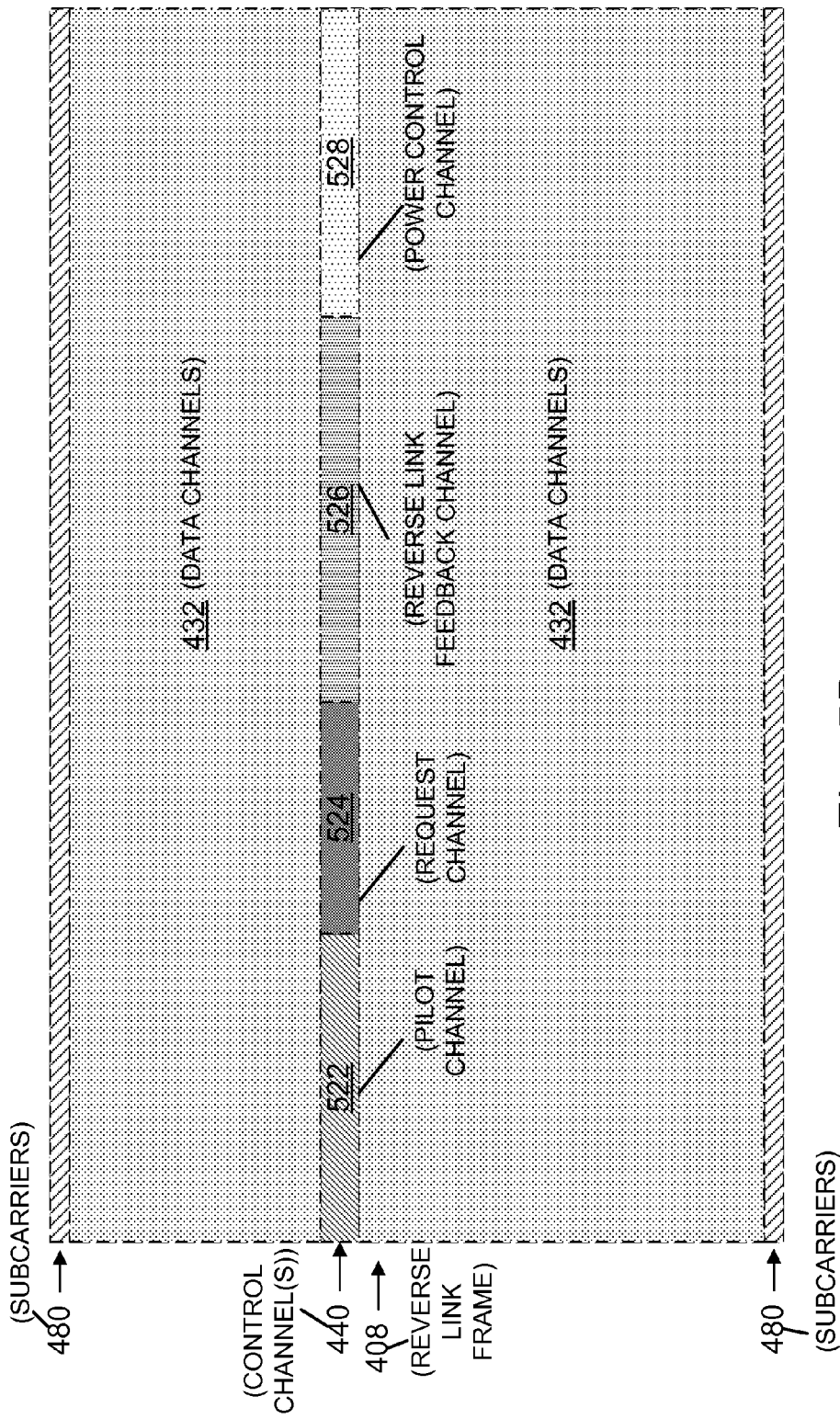
FIG. 5B illustrates aspects of a reverse link frame for a multiple access wireless communication system

Referring to FIG. 5B, aspects of a reverse link frame for a multiple access wireless communication system are illustrated. A pilot channel 522 may include pilots to allow the access point to estimate the reverse link. A request channel 524 may include information to allow an access terminal to request resources for following reverse link, and forward link, frames.

A reverse link feedback channel 526 allows access terminals to provide feedback with respect to channel information CQI. The CQI may relate to one or more scheduled modes, or available modes for scheduling, for transmission to the access terminal. Exemplary modes may include beamforming, SDMA, preceding, or combinations thereof. A power control channel 528 may be used as a reference to allow the access point to generate power control instructions for reverse link transmission, e.g. data transmissions, by the access terminal. In some aspects, the power control channel 528 may comprise one or more of the feedback channels 526. Data channels 432 may operate according to a symbol rate hopping or block hopping mode in different reverse link frames 408. Also, in certain aspects, the subcarriers 480 at the edge of the entire bandwidth may function as quasi-guard subcarriers.

It should be noted that while FIGS. 5A and 5B depict different channels that make up control channels 406 and 440 as being multiplexed in time, this need not be the case. The different channels that make up control channels 406 and 440 may be multiplexed using different orthogonal, quasi-orthogonal, or scrambling codes, different frequencies, or any combinations of time, code, and frequency.

Figure 6:
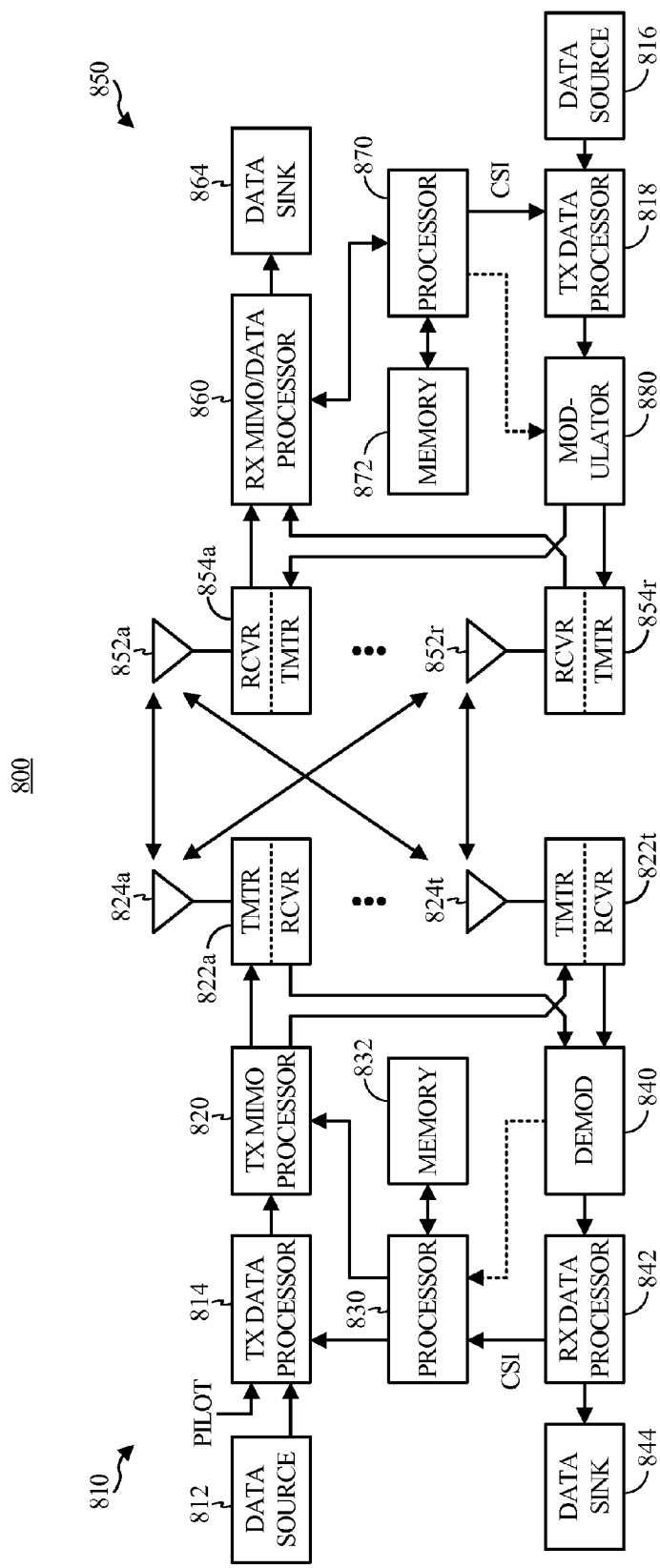
FIG. 6 illustrates aspects of first and second communication devices in a multiple access wireless communication system.

Referring to FIG. 6, a block diagram of an embodiment of an exemplary first communications device or system 810 and an exemplary second communications device or system 850 in a MIMO system 800 is illustrated. At first communications device 810, traffic data for a number of data streams is provided from a data source 812 to transmit (TX) data processor 814. In an embodiment, each data stream is transmitted over a respective transmit antenna. TX data processor 814 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 830.

The modulation symbols for each of the data streams are then provided to a TX processor 820, which may further process the modulation symbols (e.g., for OFDM). TX processor 820 then provides $N_T$ modulation symbol streams to $N_T$ transmitters (TMTR 822a through 822t). Each transmitter 822 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 822a through 822t are then transmitted from $N_T$ antennas 824a through 824t, respectively.

At second communications device 850, the transmitted modulated signals are received by $N_R$ antennas 852a through 852r and the received signal from each antenna 852 is provided to a respective receiver (RCVR) 854. Each receiver 854 (854a through 854r) conditions (e.g., filters, amplifies, and downconverts) a respective received signal, digitizes the conditioned signal to provide samples, and further processes the samples to provide a corresponding "received" symbol stream.

An RX data processor 860 then receives and processes the $N_R$ received symbol streams from $N_R$ receivers 854 based on a particular receiver processing technique to provide $N_T$ "detected" symbol streams. The processing by RX data processor 860 is described in further detail below. Each detected symbol stream includes symbols that are estimates of the modulation symbols transmitted for the corresponding data stream. RX data processor 860 then demodulates, deinterleaves, and decodes each detected symbol stream to recover the traffic data for the data stream. Recovered data is stored in data sink 864. The processing by RX data processor 860 is complementary to that performed by TX processor 820 and TX data processor 814 at first communications device 810.

RX data processor 860 may be limited in the number of subcarriers that it may simultaneously demodulate, e.g. 512 subcarriers or 5 MHz, 128 subcarriers or 1.25 MHz. 256 subcarriers or 2.5 MHz.

The channel response estimate generated by RX processor 860 may be used to perform space, space/time processing at the receiver, adjust power levels, change modulation rates or schemes, or other actions. RX processor 860 may further estimate the signal-to-noise-and-interference ratios (SNRs) of the detected symbol streams, and possibly other channel characteristics, and provides these quantities to a processor 870. RX data processor 860 or processor 870 may further derive an estimate of the "operating" SNR for the system. Processor 870 then provides channel state information (CSI), which may comprise various types of information regarding the communication link and/or the received data stream. For example, the CSI may comprise the operating SNR. The CSI is then processed by a TX data processor 818, modulated by a modulator 880, conditioned by transmitters 854a through 854r, and transmitted back to first communications device 810. Additional data from data source 816, e.g., including reverse link traffic, may be, and sometimes is, received by TX data processor 818, modulated by modulator 880, conditioned by transmitters 854a through 854r, and transmitted to first communications device 810.

At first communications device 810, the modulated signals from second communications device 850 are received by antennas 824, conditioned by receivers 822, demodulated by a demodulator 840, and processed by a RX data processor 842 to recover the CSI reported by the receiver system. The reported CSI is then provided to processor 830 and used to (1) determine the data rates and coding and modulation schemes to be used for the data streams and (2) generate various controls for TX data processor 814 and TX processor 820. Alternatively, the CSI may be utilized by processor 870 to determine modulation schemes and/or coding rates for transmission, along with other information. This may then be provided to the transmitter of the first communications device which uses this information, which may be quantized, to provide later transmissions to the receiver of the second communications device. Data recovered by RX data processor 842 may be, and sometimes is, stored in data sink 844. Recovered data may, and sometimes does, included reverse link traffic data.

Processors 830 and 870 direct the operation at the first and second communications devices, respectively. Memories 832 and 872 provide storage for program codes and data used by processors 830 and 870, respectively.

At the receiver, various processing techniques may be used to process the $N_R$ received signals to detect the $N_T$ transmitted symbol streams. These receiver processing techniques may be grouped into two primary categories (i) spatial and space-time receiver processing techniques (which are also referred to as equalization techniques); and (ii) "successive nulling/equalization and interference cancellation" receiver processing technique (which is also referred to as "successive interference cancellation" or "successive cancellation" receiver processing technique).

While FIG. 6 describes a MIMO system, the same system may be applied to a multi-input single-output system where multiple transmit antennas, e.g. those on a base station, transmit one or more symbol streams to a single antenna device, e.g. a mobile station. Also, a single output to single input antenna system may be utilized in the same manner as described with respect to FIG. 6.

The transmission techniques described herein may be implemented by various means. For example, these techniques may be implemented in hardware, firmware, software, or a combination thereof. For a hardware implementation, the processing units at a transmitter may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units at a receiver may also be implemented within one or more ASICs, DSPs, processors, and so on.

For a software implementation, the transmission techniques may be implemented with modules (e.g., procedures, functions, and so on) that perform the functions described herein. The software codes may be stored in a memory (e.g., memory 832 or 872 in FIG. 6) and executed by a processor (e.g., processor 830 or 870). The memory may be implemented within the processor or external to the processor.

It should be noted that the concept of channels herein refers to information or transmission types that may be transmitted by the access point or access terminal. It does not require or utilize fixed or predetermined blocks of subcarriers, time periods, or other resources dedicated to such transmissions.

Figure 7:
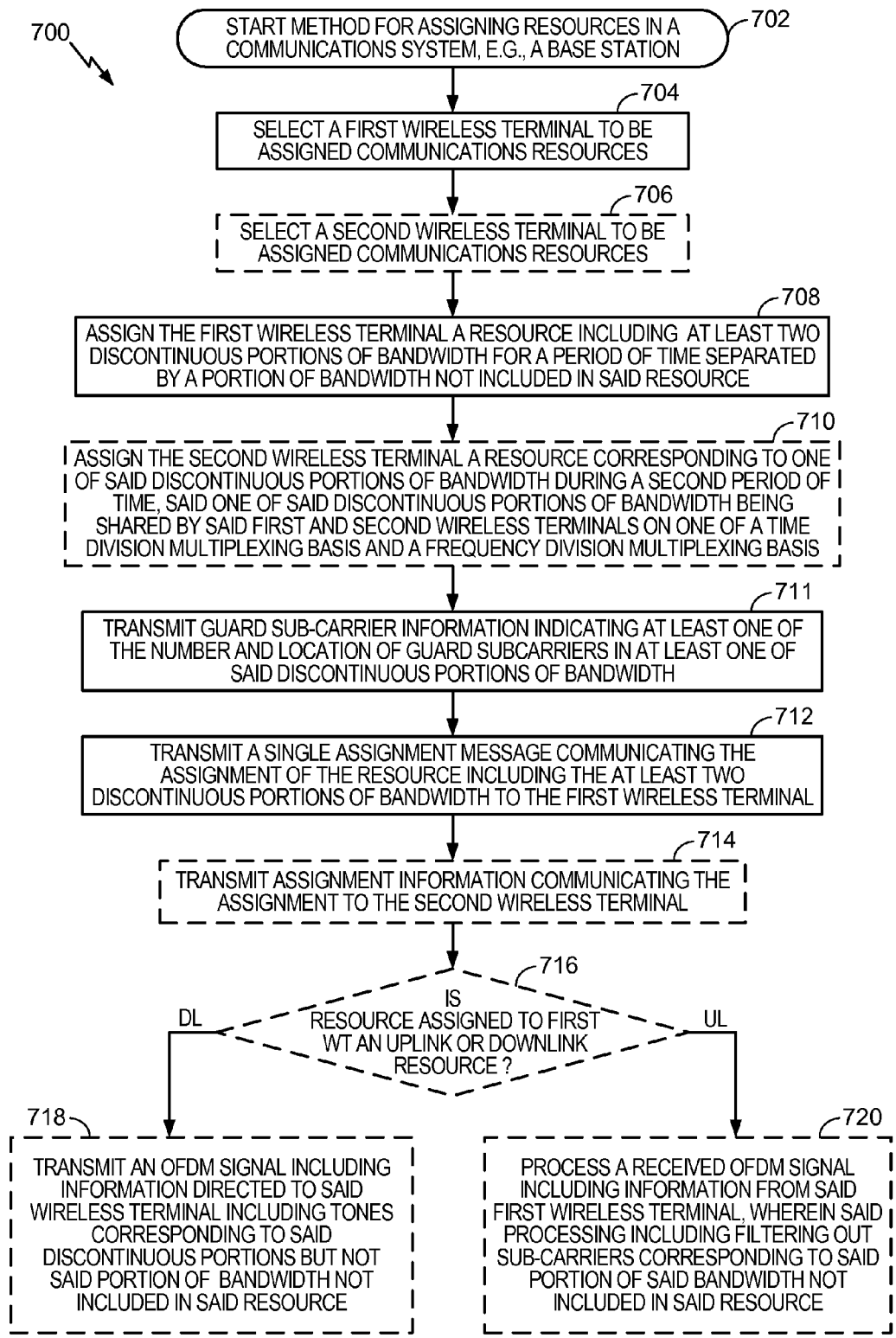
FIG. 7 is a flowchart of an exemplary method of assigning resources in a wireless communications system.

FIG. 7 is a flowchart 700 of an exemplary method of operating a communications device, e.g., a base station, access point, or central controller, for assigning resources in a wireless communications system. Operation starts in step 702, where the communications device is powered on and initialized and proceeds to step 704. In step 704 the communications device selects a first wireless terminal to be assigned communications resources, and in step 706 the communications device selects a second wireless terminal to be assigned communications resources. Operation proceeds from step 706 to step 708.

In step 708, the communications device assigns the first wireless terminal a resource including at least two discontinuous portions of bandwidth for a period of time, the two discontinuous portions of bandwidth separated by a portion of bandwidth not included in said resource. In various embodiments, the discontinuous portions of bandwidth are separated by at least 1.25 M Hz.

Operation proceeds from step 708 to step 710. In step 710, the communications device assigns the second wireless terminal a resource corresponding to one of said discontinuous portions of bandwidth during a second period of time, said one of said discontinuous portions of bandwidth being shared by said first and second wireless terminals on one of a time division multiplexing basis and a frequency division multiplexing basis. Operation proceeds from step 710 to step 711.

In step 711, the communications device transmits guard sub-carrier information indicating at least one of the number and location of guard sub-carriers in at least one of said discontinuous portions of bandwidth. In some embodiments, different numbers of guard sub-carriers are associated with different discontinuous portions of bandwidth. In some embodiments at least some of the discontinuous portions of bandwidth have guard sub-carriers at different locations. In various embodiments, guard sub-carrier information is broadcast in a preamble, e.g., a super-frame preamble. Operation proceeds from step 711 to step 712.

In step 712, the communications device transmits a single assignment message communicating the assignment of the resource including the at least two discontinuous portions of bandwidth to the first wireless terminal. In some embodiments, the transmitted assignment information includes a node identifier corresponding to a set of sub-carriers, the set of sub-carriers including at least one sub-carrier from each of the at least two discontinuous portions of bandwidth. In various embodiments, assigning comprises assigning the first wireless terminal to resources based upon a channel tree which indicates sub-carriers corresponding to a communications channel constructed from a plurality of discontinuous portions of bandwidth.

Operation proceeds from step 712 to step 714. In step 714 the communications device transmits assignment information communicating to the second wireless terminal.

In some embodiments, steps 706, 710 and 714 are optional steps and are omitted.

In some embodiments, the second wireless terminal is assigned a resource including at least two discontinuous portions of bandwidth to be used for a period of time, the two discontinuous portions of bandwidth being separated by a portion of bandwidth not included in said resource.

Steps 716, 718 and 720 are steps which are included in some embodiments, but omitted in other embodiments. Operation proceeds from step 714 to step 716. In step 716, if the resource is assigned to the first wireless terminal is a downlink resource then, the communications device is controlled to proceed from step 716 to step 718; however, if the resource assigned to the first wireless terminal is an uplink resource then the communications device is controlled to proceed from step 716 to step 720. Returning to step 718, in step 718 the communications device transmits an OFDM signal including information directed to said wireless terminal including tones corresponding to said discontinuous portions but not said portion of bandwidth not included in said resource. Returning to step 720 in step 720 the communications device processes a received OFDM signal including information from said first wireless terminal, wherein said processing includes filtering out sub-carriers corresponding to said portion of said bandwidth not included in said resource.

In one exemplary embodiment, the communications device is a base station which supports communications in a first band represented by 302 in FIG. 3 and a second band represented by 306 in FIG. 3; however the base station does not support communications in band 304 of FIG. 3. Assume that the region represented by 304 is at least 1.25 MHz. Continuing with the example, assume the first wireless terminal is assigned to use band 302 which includes 2 discontinuous portions. The base station may be restricted from using band 304 due to the communications service provider not being licensed in that bandwidth at that location. Alternatively, the base station may not be communicating in band 304 for interference control purposes.

Figure 8:
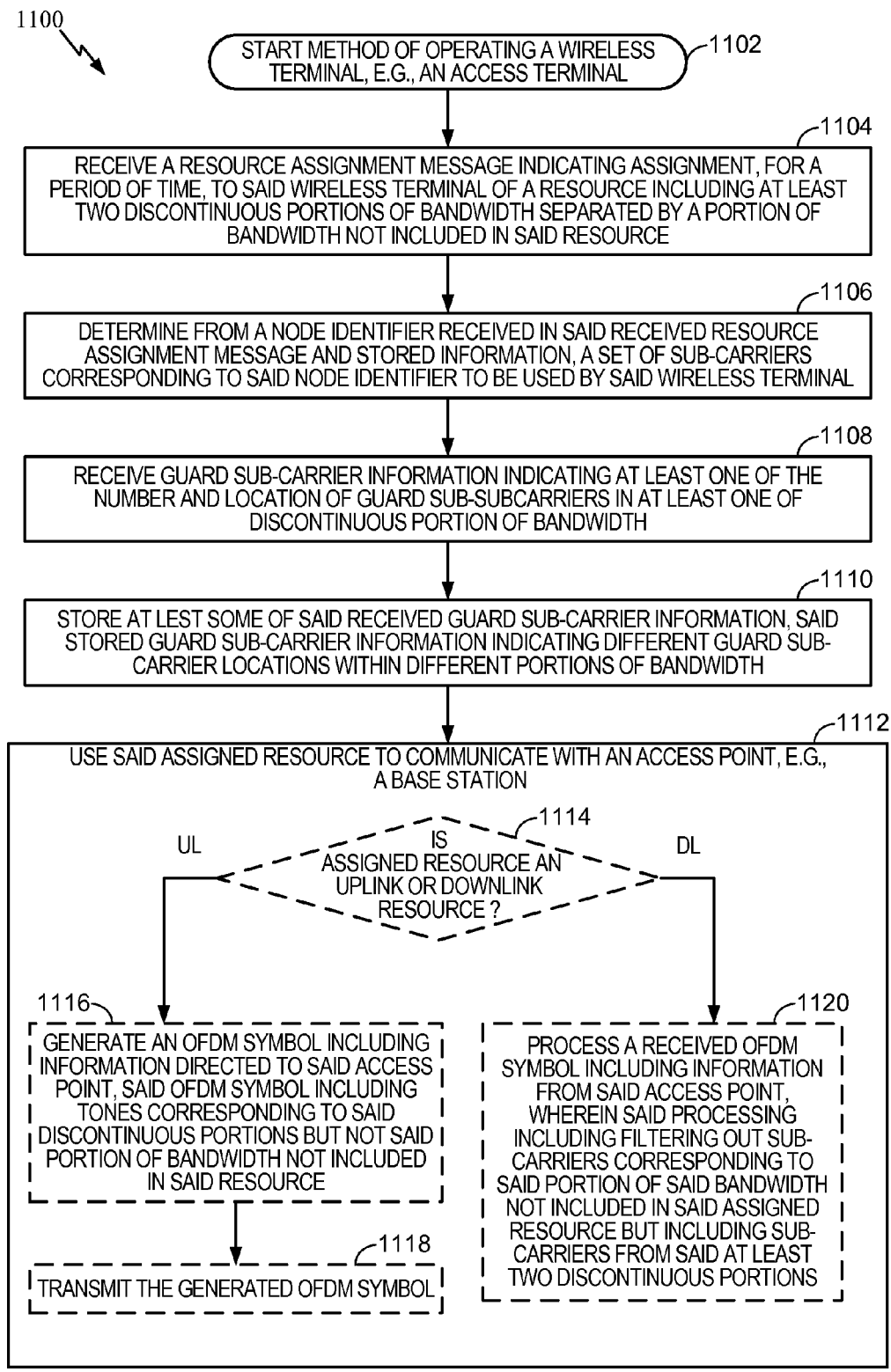
FIG. 8 is a flowchart of an exemplary method of operating a wireless terminal, e.g., access terminal, in accordance with various embodiments.

FIG. 8 is a flowchart 1100 of an exemplary method of operating a wireless terminal, e.g., access terminal, in accordance with various embodiments. Operation starts in step 1102, where the wireless terminal is powered on and initialized. Operation proceeds from start step 1102 to step 1104. In step 1104, the wireless terminal receives a resource assignment message indicating assignment, for a period of time, to said wireless terminal of a resource including at least two discontinuous portions of bandwidth separated by a portion of bandwidth not included in said resource. In some embodiments, the discontinuous portions of bandwidth are separated by at least 1.25 MHz. In some embodiments, different numbers of guard sub-carriers are associated with different discontinuous portions of bandwidth. The assigned resource may be, and sometimes is an uplink resource. The assigned resource may be, and sometimes is a downlink resource. Operation proceeds from step 1104 to step 1106.

In step 1106, the wireless terminal determines from a node identifier received in said received resource assignment message and stored information, a set of sub-carriers corresponding to said node identifier to be used by said wireless terminal. In some embodiments, the set of sub-carriers includes at least one guard sub-carrier from each of the at least two discontinuous portions of bandwidth. Operation proceeds from step 1106 to step 1108.

In step 1108, the wireless terminal receives guard sub-carrier information indicating at least one of the number and location of guard sub-carriers in at least one of the discontinuous portion of bandwidth which have been assigned to the wireless terminal. In various embodiments, receiving guard sub-carrier information includes receiving a broadcast preamble, e.g., a superframe preamble, including guard sub-carrier information. In some embodiments, the number of guard sub-carriers at the edge of a portion of a band is a function of the communications protocol being used in the adjacent band, e.g., a CDMA protocol or an OFDM protocol. Then, in step 1110 the wireless terminal stores at least some of said received guard sub-carrier information, said stored guard sub-carrier information indicating different guard sub-carrier locations within different portions of bandwidth. Operation proceeds from step 1110 to step 1112.

In step 1112, the wireless terminal uses said assigned resource to communicate with an access point, e.g., a base station. In some embodiments, step 1112 includes one or more of steps 1114, 1116, 1118 and 1120. In step 1114, the wireless terminal determines whether the assigned resource is an uplink or downlink resource. If the assigned resource is an uplink resource then operation proceeds from step 1114 to step 1116. If the assigned resource is a downlink resource, then operation proceeds from step 1114 to step 1120. Returning to step 1116, in step 1116 the wireless terminal generates an OFDM symbol including information directed to said access point, said OFDM symbol including tones corresponding to said discontinuous portions but not said portion of bandwidth not included in said resource. Then in step 1118 the wireless terminal transmits the generated OFDM symbol using the assigned resource. Returning to step 1120, in step 1120, the wireless terminal processes a received OFDM symbol including information from said access point, wherein said processing includes filtering out sub-carriers corresponding to said portion of said bandwidth not included in said assigned resource but including sub-carriers from said at least two discontinuous portions.

Figure 9:
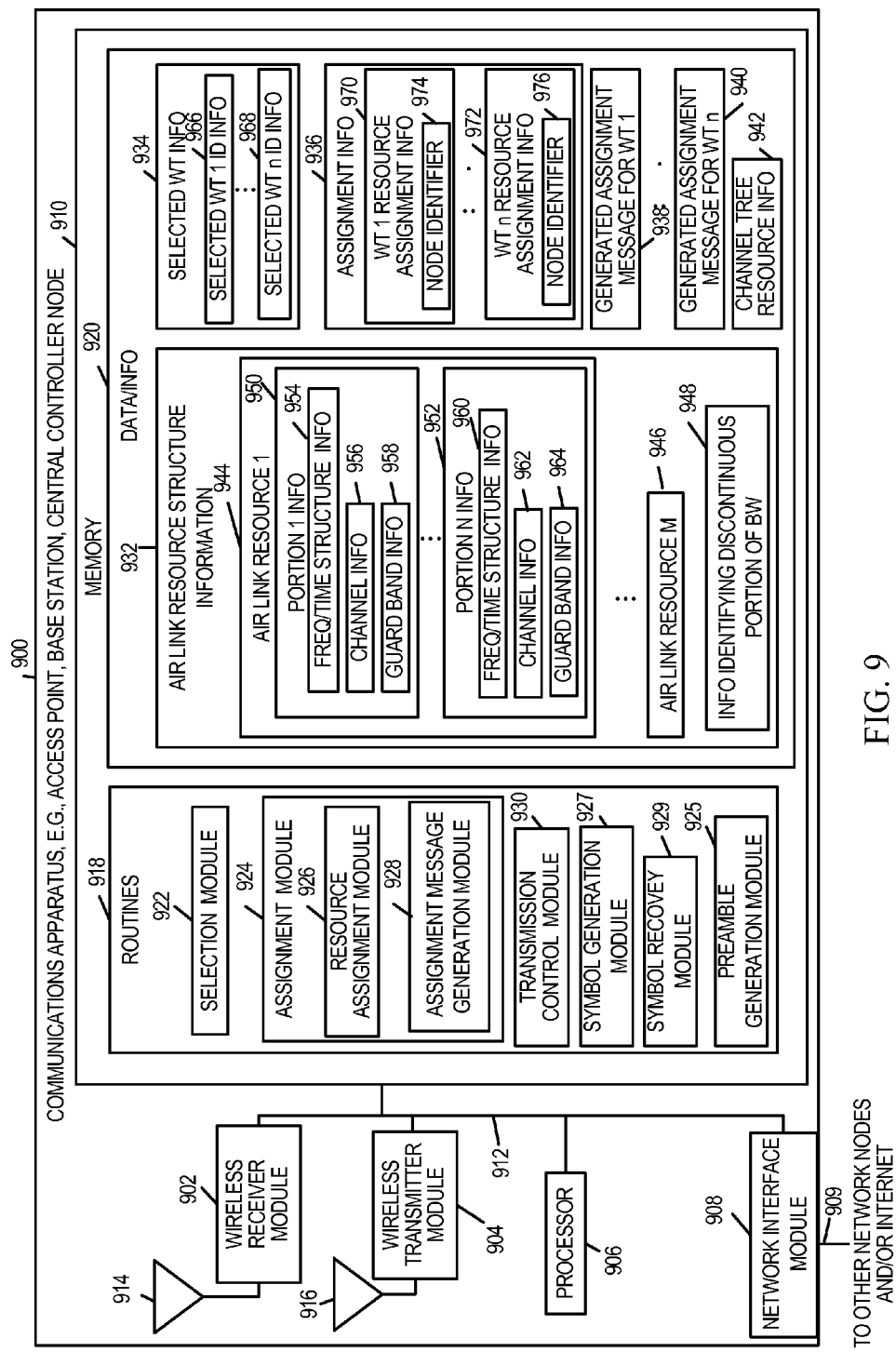
FIG. 9 is a drawing of an exemplary communications device, e.g., a base station, access point or central controller node, which assigns resources in a wireless communications system.

FIG. 9 is a drawing of an exemplary communications apparatus 900, e.g., a base station, access point or centralized controller node, used for assigning resources in a wireless communications system, in accordance with various embodiments. Exemplary communications apparatus 900 includes a wireless receiver module 902, a wireless transmitter module 904, a processor 906, a network interface module 908 and memory 910 coupled together via a bus 912 over which the various elements may interchange data and information. Memory 910 includes routines 918 and data/information 920. The processor 906, e.g., a CPU, executes the routines 918 and uses the data/information 920 in memory 910 to control the operation of the communications apparatus 900 and implement methods, e.g., the methods of flowchart 700 of FIG. 7.

Wireless receiver module 902, e.g., an OFDM or CDMA receiver, is coupled to receive antenna 914 via which the communications apparatus receives signals including signals from which interference is measured.

Wireless transmitter module 904, e.g., an OFDM or CDMA transmitter, is coupled to transmit antenna 916, via which the communications apparatus transmits signals. Wireless transmitter module 904 transmits resource assignments and at least some of the resource assignments include allocation of discontinuous portions of bandwidth to a wireless terminal. Wireless transmitter module 904 transmits generated assignment messages (938, . . . , 940). In some embodiments, wireless transmitter module 904 transmits an OFDM symbol including information directed to a wireless terminal including tones corresponding to discontinuous portions but refrains from transmitting on said portion of bandwidth not included in said assigned resource, e.g., there is a null region in the transmitted OFDM symbol between the discontinuous portions. Wireless transmitter module 904 also broadcasts a preamble including guard band information, e.g., information identifying the number and/or location of guard sub-carriers in one or more discontinuous portions of a band.

In some embodiments, the same antenna is used for transmission and reception. In some embodiments multiple antennas and/or multiple antenna elements are used for reception. In some embodiments multiple antennas and/or multiple antenna elements are used for transmission. In some embodiments at least some of the same antennas or antenna elements are used for both transmission and reception. In some embodiments, the wireless communications apparatus 900 uses MIMO techniques.

Network interface module 908 is coupled to other network nodes, e.g., other access points/base stations, AAA node, home agent node, etc, and/or the Internet via network link 909.

Routines 918 include a selection module 922, an assignment module 924, a transmission control module 930, a symbol generation module 927, a symbol recovery module 929, and a preamble generation module 925. The assignment module 924 includes a resource assignment module 926 and an assignment message generation module 928.

Data/information 920 includes air link resource structure information 932, selected wireless terminal information 934, assignment information 936, generated assignment messages (assignment message for WT 1 938, . . . , assignment message for WT n 940), and channel tree resource information 942. Air link resource structure information 932 includes information corresponding to a plurality of air link resources (air link resource 1 information 944, . . . , air link resource M information 946) and information identifying discontinuous portions of bandwidth 948. Air link resource 1 information 944 includes information corresponding to a plurality of portions (portion 1 information 950, . . . , portion N information 952). Portion 1 information 950 includes frequency/time structure information 954, channel information 956 and guard band information 958. Portion N information 952 includes frequency/time structure information 960, channel information 962 and guard band information 964. At least some of the portions in air link resource information 944 are discontinuous with another portion, e.g., there is an intermediate frequency band region that is not part of the air link resource 1.

For example, air link resource 1 information 944 represents stored airlink resource information indicating a first communications band available for assignment, while air link resource M information 946 represents stored airlink resource information indicating a second communications band available for assignment. Portion 1 information 950 represents information corresponding to a first discontinuous portion of bandwidth in the first communications band, while portion N information 952 represents information corresponding to a second discontinuous portion of bandwidth in the first communications band. The discontinuous portions of bandwidth, in some embodiments, are separated by at least 1.25 MHz. Guard band information 958 includes information about at least one of the number and location of guard bands within portion 1 of the first communications band. Guard band information 964 includes information about at least one of the number and location of guard bands within portion N of the first communications band. A guard band, in some embodiments, is a set of one or a few sub-carriers at a boundary area, e.g., sub-carriers at a boundary which are intentionally left unused.

Selected wireless terminal information 934 includes information identifying a plurality of wireless terminals which have been selected by communications device 900 to be assigned air link resources (selected wireless terminal 1 identification information 966, . . . , selected WT n identification information 968). Assignment information 936 includes a plurality of set of resource assignment information (WT 1 resource assignment information 970 including node identifier 974, . . . , WT n resource assignment information 972 including node identifier 976).

Channel tree resource information 942 includes information indicating sub-carriers corresponding to a communications channel constructed from a plurality of discontinuous portions of bandwidth.

Selection module 922 selects wireless terminals to be assigned communication resources. For example, selection module 922 selects a first wireless terminal to be assigned a communication resource. Selected wireless terminal information 934 is an output of selection module 922.

Resource assignment module 926 assigns a wireless terminal selected by the selection module 922 a resource. For example, the resource assignment module 926 assigns the first wireless terminal selected by the selection module 922 a resource including at least two discontinuous portions of bandwidth for a period of time, said two discontinuous portions of bandwidth being separated by a portion of bandwidth not included in said assigned resource. The assigned resource may be, and sometimes is an uplink resource. The assigned resource may be, and sometimes is, a downlink resource. Assignment information 936 represents outputs of resource assignment module 926.

Assignment message generation module 928 generates assignment messages communicating resource assignments to wireless terminals. For example, assignment message generation module 928 generates a single assignment message communicating the assignment of a resource including the at least tow discontinuous portions of bandwidth to the first wireless terminal. In some embodiments, the assignment message generation module 928 generates an assignment message including a node identifier corresponding to a set of sub-carriers, the set of sub-carriers including at least one sub-carrier from each of at least two discontinuous portions of bandwidth. Generated assignment messages (938, . . . , 940) represent outputs of assignment message generation module 928.

Transmission control module 930 controls the wireless transmitter module 904 to transmit signals, e.g., preambles, assignment messages, downlink traffic channel signals and downlink control channel signals.

Symbol generation module 927 generates OFDM symbols. In some embodiments, at least some of the generated OFDM symbols include tones corresponding to discontinuous portions of a band but not said portion of bandwidth not included in said assigned resource. For example, consider that the generated OFDM symbol corresponds to the band represented by element 302 of FIG. 3 and that band 304 is not used by the communications device, an exemplary generated OFDM symbol includes sub-carriers corresponding to the upper portion of 302 and the lower portion of 302, but does not include sub-carriers corresponding to the region of band 304.

Symbol recovery module 929 recovers information from received OFDM symbols. In some embodiments for at least some bands which include discontinuous portions, the symbol recovery module 929 filters out sub-carriers in the portion of bandwidth not included in the assigned resource, e.g., the portion between the two discontinuous portions.

Preamble generation module 925 generates a preamble, e.g., a preamble for a super-frame, which conveys guard band information, e.g., at least some of guard band information (958, 964).

Figure 10:
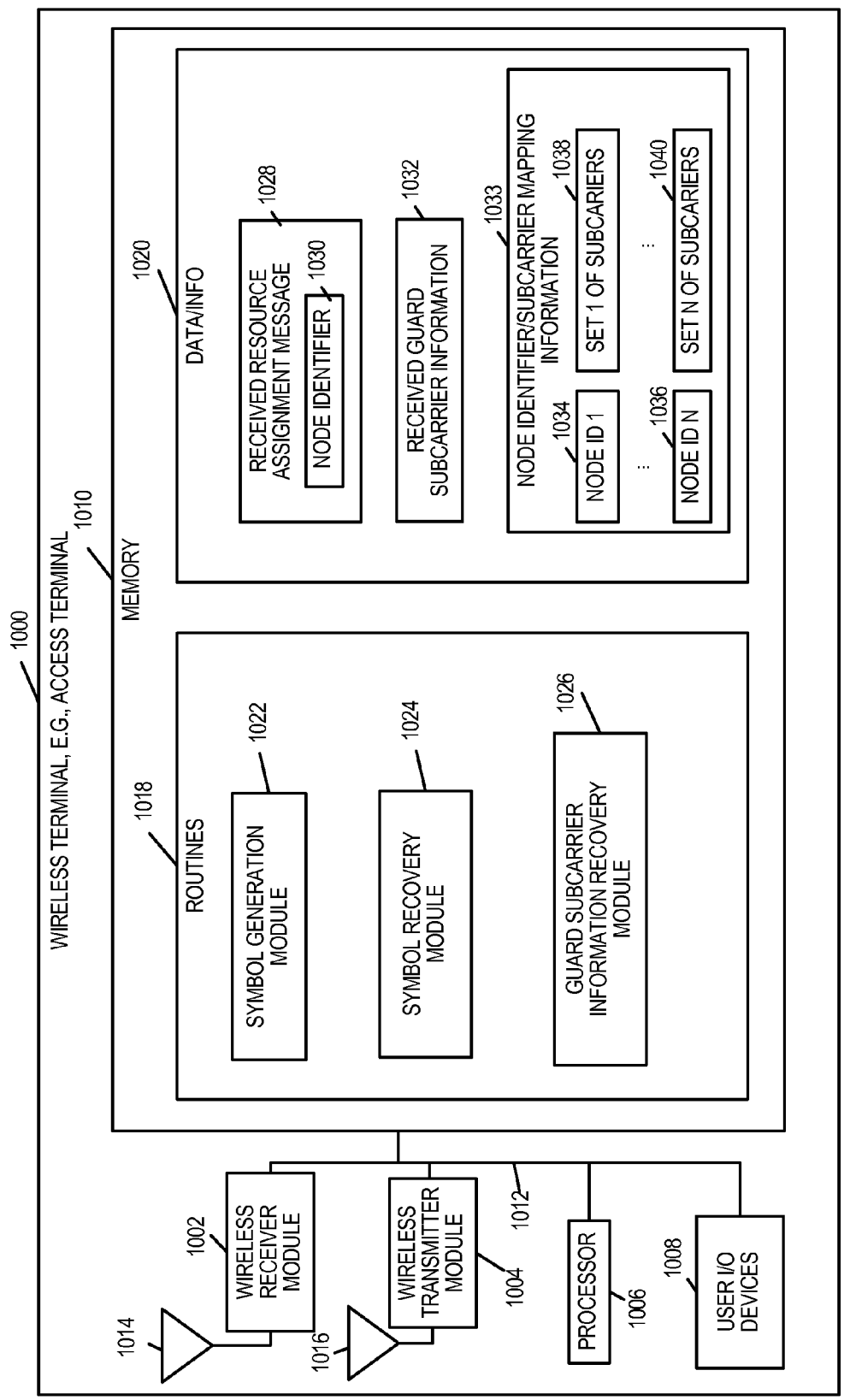
FIG. 10 is a drawing of an exemplary wireless terminal, e.g., an access terminal, in accordance with various embodiments.

FIG. 10 is a drawing of an exemplary wireless terminal 1000, e.g., an access terminal, in accordance with various embodiments. Exemplary wireless terminal 1000 includes a wireless receiver module 1002, a wireless transmitter module 1004, a processor 1006, user I/O devices 1008 and memory 1010 coupled together via a bus 1012 over which the various elements may interchange data and information. Memory 1010 includes routines 1018 and data/information 1020. The processor 1006, e.g., a CPU, executes the routines 1018 and uses the data/information 1020 in memory 1010 to control the operation of the wireless terminal 1000 and implement methods, e.g., the methods of flowchart 1100 of FIG. 8.

Wireless receiver module 1002, e.g., an OFDM receiver, is coupled to receive antenna 1014 via which the wireless terminal 1000 receives downlink signals from communications devices, e.g., access points. Wireless receiver module 1002 receives a preamble, said preamble conveying guard sub-carrier information. Wireless receiver module 1002 also receives information communicated in forward link frames, e.g., downlink traffic data and control data. Wireless receiver module 1002 receives a resource assignment message, e.g., message 1028, said resource assignment message indicating assignment, for a period of time, to said wireless terminal 1000 of a resource including at least tow discontinuous portions of bandwidth separated by a portion of bandwidth not included in said resource. For example, the resource assignment message 1028 may indicate that wireless terminal 1000 has been assigned the air link resource designated 302 in FIG. 3. The assigned resource may be, and sometimes is an uplink resource. The assigned resource may be, and sometimes is, a downlink resource.

In some embodiments, different numbers of guard sub-carriers can be, and sometimes are, associated with different discontinuous portions of bandwidth. In various embodiments, the discontinuous portions of bandwidth are separated by at least 1.25 MHz.

Wireless transmitter module 1004, e.g., an OFDM transmitter, is coupled to transmit antenna 1016 via which the wireless terminal 1000 transmits uplink signals to communications devices, e.g., to access points. Transmitter module 1004 transmits symbols, e.g., OFDM symbols, generated by symbol generation module 1022. At times, the generated symbols include subcarriers corresponding to two discontinuous portions of a resource which has been assigned and include an intentional null region between the two discontinuous portions.

In some embodiments, the same antenna is used for transmission and reception. In some embodiments multiple antennas and/or multiple antenna elements are used for reception. In some embodiments multiple antennas and/or multiple antenna elements are used for transmission. In some embodiments at least some of the same antennas or antenna elements are used for both transmission and reception. In some embodiments, the wireless terminal 1000 uses MIMO techniques.

User I/O devices 1008 include, e.g., microphone, keyboard, keypad, switches, camera, speaker, display, etc. User I/O devices 1008 allow a user of wireless terminal 1000 to input data/information, access output data/information, and control at least some functions of the wireless terminal 1000, e.g., initiate a communications session with a peer node, e.g., another wireless terminal.

Routines 1018 include a symbol generation module 1022, a symbol recovery module 1024 and a guard sub-carrier information recovery module 1026. Data/information 1020 includes a received resource assignment message 1028, received guard sub-carrier information 1032 and node identifier/sub-carrier mapping information 1033. The received resource assignment message 1028 includes a node identifier 1030. Received guard sub-carrier information 1032 includes information indicating different guard sub-carrier locations within different discontinuous portions of bandwidth. In some embodiments, the guard sub-carrier information is extracted from a received preamble, e.g., a preamble of a superframe. The node identifier/sub-carrier mapping information 1033 includes sets of sub-carriers corresponding to node identifiers ((node identifier 1 1034 and corresponding set 1 of sub-carriers 1038), . . . , (node identifier N 1036 and corresponding set N of sub-carriers 1040)). In various embodiments, a set of sub-carriers corresponding to a node identifier includes at least one guard sub-carrier from each of the at least two discontinuous portions of bandwidth corresponding to the resource identified by the node identifier.

Symbol generation module 1022 generates symbols corresponding to the allocated resource. In some embodiments, the symbol generation module 1022 is an OFDM symbol generation module which generates an OFDM symbol including information directed to an access point, said OFDM symbol including tones corresponding to said discontinuous portions but not said portion of bandwidth not included in said resource. Tones may be, and sometimes are, also referred to as sub-carriers.

Symbol recovery module 1024 recovers symbols, e.g., OFDM symbols, corresponding to an allocated resource. If the allocated resource includes two discontinuous portions separated by a portion of bandwidth not included in the resource, the symbol recovery module 1024 filters out the sub-carriers in the portion of bandwidth not included in the resource as part of the recovery operation.

Guard sub-carrier information recovery module 1026 recovers received information indicating at least one of the number and location of guard sub-carriers in at least one of said discontinuous portions of bandwidth.

The previous description of the disclosed embodiments is provided to enable any person skilled in the art to make or use the various features. Various modifications to these embodiments will be readily apparent to those skilled in the art, and the generic principles defined herein may be applied to other embodiments without departing from the spirit or scope. Thus, the various embodiments are not intended to be limited to the embodiments shown herein but are to be accorded the widest scope consistent with the principles and novel features disclosed herein.

In various embodiments, nodes described herein are implemented using one or more modules to perform the steps corresponding to one or more methods of the aspect, for example, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, compact disc, DVD, etc. to control a machine, e.g., general purpose computer with or without additional hardware, to implement all or portions of the above described methods, e.g., in one or more nodes. Accordingly, among other things, the aspect is directed to a machine-readable medium including machine executable instructions for causing a machine, e.g., processor and associated hardware, to perform one or more of the steps of the above-described method(s).

In various embodiments nodes described herein are implemented using one or more modules to perform the steps corresponding to one or more methods, for example, signal processing, message generation, information recovery, and/or transmission steps. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, compact disc, DVD, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

In some embodiments, the processor or processors, e.g., CPUs, of one or more devices, e.g., communications devices such as access terminals and/or access points, are configured to perform the steps of the methods described as being performed by the communications device. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed is:

1. A method for assigning resources in a wireless communication system comprising:
   operating a control node to perform the steps of:
   transmitting, on a control channel formed from a group of contiguous subcarriers in bandwidth including at least some discontinuous subcarriers, guard subcarrier information, said guard subcarrier information indicating both the number and location of guard subcarriers in a plurality of discontinuous portions of bandwidth corresponding to a first carrier that may be assigned by said control node;
   selecting a first wireless terminal to be assigned a communications resource;
   assigning the first wireless terminal a resource including at least two discontinuous portions of bandwidth corresponding to the first carrier for a period of time, said at least two discontinuous portions of bandwidth being discontinuous portions of bandwidth from said plurality of discontinuous portions of bandwidth, said at least two discontinuous portions of bandwidth including a first portion of bandwidth and a second portion of bandwidth, said first and second portions of bandwidth being separated by a third portion of bandwidth corresponding to another carrier not included in said resource, said third portion of bandwidth being larger than either of said two discontinuous portions of bandwidth and being a portion of bandwidth which is not used by said control node; and
   transmitting a single assignment message communicating the assignment of the resource including the at least two discontinuous portions of bandwidth to the first wireless terminal, said assignment message including a node identifier corresponding to a set of subcarriers including at least one guard subcarrier from each of the at least two discontinuous portions of bandwidth corresponding to the resource.

2. The method of claim 1,
   wherein different numbers of guard subcarriers are included in said first and second portions of bandwidth.

3. The method of claim 1,
   wherein transmitting guard subcarrier information indicating both the number and location of guard subcarriers in a plurality of discontinuous portions of bandwidth corresponding to a first carrier includes transmitting an allocation map identifying the number and location of guard subcarriers within portions of said bandwidth corresponding to the first carrier.

4. The method of claim 3, wherein at least some of said discontinuous portions of bandwidth have guard subcarriers located at different locations.

5. The method of claim 3, wherein said guard subcarrier information is broadcast in a preamble.

6. The method of claim 1,
   wherein said single assignment message assigns said at least two discontinuous portions of bandwidth to be used at the same time as an uplink band or a downlink band.

7. The method of claim 6, further comprising:
   assigning a second terminal a resource corresponding to one of said discontinuous portions of bandwidth during a second period of time, said one of said discontinuous portions of bandwidth being shared by said first and second wireless terminals on one of a time division multiplexing basis and frequency division multiplexing basis.

8. The method of claim 6, wherein said discontinuous portions of bandwidth are separated by at least 1.25 MHz.

9. The method of claim 6, wherein assigning comprises assigning the first terminal to resources based upon a channel tree which indicates sub-carriers corresponding to a communications channel constructed from a plurality of discontinuous portions of bandwidth.

10. The method of claim 6, wherein said resource is an uplink resource.

11. The method of claim 6, wherein said resource is a downlink resource.

12. The method of claim 1, further comprising:
   transmitting an OFDM signal including information directed to said wireless terminal including tones corresponding to said discontinuous portions but not said portion of bandwidth not included in said resource.

13. A communications apparatus for assigning resources in a wireless communication system, the apparatus comprising:
   a wireless transmitter configured to transmit, on a control channel formed from a group of contiguous subcarriers in bandwidth including at least some discontinuous subcarriers, guard subcarrier information, said guard subcarrier information indicating both the number and location of guard subcarriers in a plurality of discontinuous portions of bandwidth corresponding to a first carrier that may be assigned by said control node;
   a selection module for selecting a first wireless terminal to be assigned a communications resource;
   a resource assignment module for assigning the first wireless terminal selected by said selection module a resource including at least two discontinuous portions of bandwidth corresponding to the first carrier for a period of time, said at least two discontinuous portions of bandwidth being discontinuous portions of bandwidth from said plurality of discontinuous portions of bandwidth, said at least two discontinuous portions of bandwidth including a first portion of bandwidth and a second portion of bandwidth, said first and second portions of bandwidth being separated by a third portion of bandwidth corresponding to another carrier not included in said resource, said third portion of bandwidth being larger than either of said two discontinuous portions of bandwidth and being a portion of bandwidth which is not used by said communications apparatus;

wherein said wireless transmitter is further configured to transmit a single assignment message communicating the assignment of the resource including the at least two discontinuous portions of bandwidth to the first wireless terminal, said assignment message including a node identifier corresponding to a set of subcarriers including at least one guard subcarrier from each of the at least two discontinuous portions of bandwidth corresponding to the resource; and memory for storing information.

14. The apparatus of claim 13, further comprising:

an assignment message generation module for generating said single assignment message; and wherein said wireless transmitter is further configured to transmit, as part of transmitting guard subcarrier information indicating both the number and location of guard subcarriers, an allocation map identifying the number and location of guard subcarriers within portions of said bandwidth corresponding to the first carrier.

15. The apparatus of claim 14, wherein said memory includes stored airlink resource information indicating communications bands available for assignment.

16. The apparatus of claim 15, wherein said memory includes stored airlink resource information identifying different discontinuous portions of bandwidth available for allocation corresponding to a resource.

17. The apparatus of claim 16 wherein said discontinuous portions of bandwidth are separated by at least 1.25 MHz.

18. The apparatus of claim 16, wherein said memory further includes channel tree resource information indicating sub-carriers corresponding to a communications channel constructed from a plurality of discontinuous portions of bandwidth.

19. The apparatus of claim 14, wherein said resource is an uplink resource.

20. The apparatus of claim 14, wherein said resource is a downlink resource.

21. The apparatus of claim 13, further comprising:

a symbol generation module for generating an OFDM symbol including tones corresponding to said discontinuous portions but not said portion of bandwidth not included in said resource; and a wireless OFDM transmitter module for transmitting an OFDM signal including information directed to said wireless terminal including tones corresponding to said discontinuous portions but not said portion of bandwidth not included in said resource.

22. A communications apparatus for assigning resources in a wireless communication system, the apparatus comprising:

means for transmitting, on a control channel formed from a group of contiguous subcarriers in bandwidth including at least some discontinuous subcarriers, guard subcarrier information, said guard subcarrier information indicating both the number and location of guard subcarriers in a plurality of discontinuous portions of bandwidth corresponding to a first carrier that may be assigned by said control node;

selection means for selecting a first wireless terminal to be assigned a communications resource;

means for assigning the first wireless terminal selected by said selection means a resource including at least two discontinuous portions of bandwidth corresponding to the first carrier for a period of time, said at least two discontinuous portions of bandwidth being discontinuous portions of bandwidth from said plurality of discontinuous portions of bandwidth, said at least two discontinuous portions of bandwidth including a first portion of bandwidth and a second portion of bandwidth, said first and second portions of bandwidth being separated by a third portion of bandwidth corresponding to another carrier not included in said resource, said third portion of bandwidth being larger than either of said two discontinuous portions of bandwidth and being a portion of bandwidth which is not used by said communications apparatus;

wherein said means for transmitting are also for transmitting a single assignment message communicating the assignment of the resource including the at least two discontinuous portions of bandwidth to the first wireless terminal, said assignment message including a node identifier corresponding to a set of subcarriers including at least one guard subcarrier from each of the at least two discontinuous portions of bandwidth corresponding to the resource; and memory means for storing information.

23. The apparatus of claim 22, further comprising:

means for generating said single assignment message.

24. The apparatus of claim 23, wherein said memory means for storing include stored airlink resource information indicating communications bands available for assignment.

25. The apparatus of claim 22, further comprising:

means for generating an OFDM symbol including tones corresponding to said discontinuous portions but not said portion of bandwidth not included in said resource; and means for transmitting an OFDM signal including information directed to said wireless terminal including tones corresponding to said discontinuous portions but not said portion of bandwidth not included in said resource.

26. An apparatus comprising:

a processor configured to control said apparatus to:

transmit, on a control channel formed from a group of contiguous subcarriers in bandwidth including at least some discontinuous subcarriers, guard subcarrier information, said guard subcarrier information indicating both the number and location of guard subcarriers in a plurality of discontinuous portions of bandwidth corresponding to a first carrier that may be assigned by said control node;

select a first wireless terminal to be assigned a communications resource;

assign the first wireless terminal a resource including at least two discontinuous portions of bandwidth corresponding to the first carrier for a period of time, said at least two discontinuous portions of bandwidth being discontinuous portions of bandwidth from said plurality of discontinuous portions of bandwidth, said at least two discontinuous portions of bandwidth including a first portion of bandwidth and a second portion of bandwidth, said first and second portions of bandwidth being separated by a third portion of bandwidth corresponding to another carrier not included in said resource, said third portion of bandwidth being larger than either of said two discontinuous portions of bandwidth and being a portion of bandwidth which is not used by said apparatus; and transmit a single assignment message communicating the assignment of the resource including the at least two discontinuous portions of bandwidth to the first wireless terminal, said assignment message including a node identifier corresponding to a set of subcarriers including at least one guard subcarrier from each of the at least two discontinuous portions of bandwidth corresponding to the resource; and memory coupled to said processor.

27. The apparatus of claim 26, wherein different numbers of guard subcarriers are included in said first and second portions of bandwidth.

28. The apparatus of claim 26, wherein said processor is further configured to control said apparatus to:

transmit an allocation map identifying the number and location of guard subcarriers within portions of said bandwidth corresponding to the first carrier, as part of being configured to control said apparatus to transmit guard subcarrier information indicating both the number and location of guard subcarriers in said-plurality of discontinuous portions of bandwidth corresponding to the first carrier.

29. The apparatus of claim 26, wherein said single assignment message assigns said at least two discontinuous portions of bandwidth to be used at the same time as an uplink band or a downlink band.

30. The apparatus of claim 26, wherein said processor is further configured to control said apparatus to:

transmit an OFDM signal including information directed to said wireless terminal including tones corresponding to said discontinuous portions but not said portion of bandwidth not included in said resource.

31. A non-transitory computer readable medium embodying machine executable instructions for controlling a communications device to implement a method of assigning resources in a wireless communication system, the method comprising:

transmitting, on a control channel formed from a group of contiguous subcarriers in bandwidth including at least some discontinuous subcarriers, guard subcarrier information, said guard subcarrier information indicating both the number and location of guard subcarriers in a plurality of discontinuous portions of bandwidth corresponding to a first carrier that may be assigned by said control node;

selecting a first wireless terminal to be assigned a communications resource; and assigning the first wireless terminal a resource including at least two discontinuous portions of bandwidth corresponding to the first carrier for a period of time, said at least two discontinuous portions of bandwidth being discontinuous portions of bandwidth from said plurality of discontinuous portions of bandwidth, said at least two discontinuous portions of bandwidth including a first portion of bandwidth and a second portion of bandwidth, said first and second portions of bandwidth being separated by a third portion of bandwidth corresponding to another carrier not included in said resource, said third portion of bandwidth being larger than either of said two discontinuous portions of bandwidth and being a portion of bandwidth which is not used by said communications device; and transmitting a single assignment message communicating the assignment of the resource including the at least two discontinuous portions of bandwidth to the first wireless terminal, said assignment message including a node identifier corresponding to a set of subcarriers including at least one guard subcarrier from each of the at least two discontinuous portions of bandwidth corresponding to the resource.

32. The non-transitory computer readable medium of claim 31, wherein different numbers of guard subcarriers are included in said first and second portions of bandwidth.

33. The non-transitory computer readable medium of claim 31, wherein transmitting guard subcarrier information indicating both the number and location of guard subcarriers in said plurality of discontinuous portions of bandwidth includes transmitting an allocation map identifying the number and location of guard subcarriers within portions of said bandwidth corresponding to the first carrier.

34. The non-transitory computer readable medium of claim 31, wherein said single assignment message assigns said at least two discontinuous portions of bandwidth to be used at the same time as an uplink band or a downlink band.

35. The non-transitory computer readable medium of claim 31, further embodying machine executable instructions for:

transmitting an OFDM signal including information directed to said wireless terminal including tones corresponding to said discontinuous portions but not said portion of bandwidth not included in said resource.

36. A method of operating a wireless terminal comprising:

receiving from a control node, on a control channel formed from a group of contiguous subcarriers in bandwidth including at least some discontinuous subcarriers, guard subcarrier information, said guard subcarrier information indicating both the number and location of guard subcarriers in a plurality of discontinuous portions of bandwidth corresponding to a first carrier that may be assigned by said control node;

receiving from the control node a resource assignment message indicating assignment, to said wireless terminal of a resource including at least two discontinuous portions of bandwidth corresponding to the first carrier for a period of time, said at least two discontinuous portions of bandwidth being discontinuous portions of bandwidth from said plurality of discontinuous portions of bandwidth, said assignment message including a node identifier corresponding to a set of subcarriers including at least one guard subcarrier from each of the at least two discontinuous portions of bandwidth corresponding to the resource, said at least two discontinuous portions of bandwidth including a first portion of bandwidth and a second portion of bandwidth, said first and second portions of bandwidth being separated by a third portion of bandwidth corresponding to another carrier not included in said resource, said third portion of bandwidth being larger than either of said two discontinuous portions of bandwidth and being a portion of bandwidth which is not used by said control node; and using said assigned resource to communicate with said control node.

37. The method of claim 36, wherein different numbers of guard subcarriers are included in said first and second portions of bandwidth.

38. The method of claim 36, wherein receiving guard subcarrier information includes receiving an allocation map identifying the number and location of guard subcarriers within portions of said bandwidth corresponding to the first carrier.

39. The method of claim 38, further comprising:
storing at least some of said received guard subcarrier information, said stored guard subcarrier information indicating different guard subcarrier locations within different discontinuous portions of bandwidth.

40. The method of claim 38, wherein receiving guard subcarrier information includes receiving a broadcast superframe preamble including said guard subcarrier information.

41. The method of claim 36, wherein said discontinuous portions of bandwidth are separated by at least 1.25 MHz.

42. The method of claim 41, further comprising:
determining from the node identifier and stored information a set of sub-carriers corresponding to said node identifier to be used by said wireless terminal.

43. The method of claim 41, wherein said resource is an uplink resource.

44. The method of claim 43, further comprising:
generating an OFDM symbol including information directed to said control node, said OFDM symbol including tones corresponding to said discontinuous portions but not said portion of bandwidth not included in said resource; and
wherein using said assigned resource includes transmitting said generated OFDM symbol.

45. The method of claim 41, wherein said resource is a downlink resource.

46. A wireless terminal comprising:
a receiver module configured to receive, from a control node, on a control channel formed from a group of contiguous subcarriers in bandwidth including at least some discontinuous subcarriers, guard subcarrier information, said guard subcarrier information indicating both the number and location of guard subcarriers in a plurality of discontinuous portions of bandwidth corresponding to a first carrier that may be assigned by said control node, and receive a resource assignment message indicating assignment, to said wireless terminal, of a resource including at least two discontinuous portions of bandwidth corresponding to the first carrier for a period of time, said at least two discontinuous portions of bandwidth being discontinuous portions of bandwidth from said plurality of discontinuous portions of bandwidth, said assignment message including a node identifier corresponding to a set of subcarriers including at least one guard subcarrier from each of the at least two discontinuous portions of bandwidth corresponding to the resource, said at least two discontinuous portions of bandwidth including a first portion of bandwidth and a second portion of bandwidth, said first and second portions of bandwidth being separated by a third portion of bandwidth corresponding to another carrier not included in said resource, said third portion of bandwidth being larger than either of said two discontinuous portions of bandwidth and being a portion of bandwidth which is not used by said control node; and
at least one of:
i) a symbol generation module for generating symbols corresponding to the allocated resource and
ii) a symbol recovery module for recovering symbols corresponding to the allocated resource.

47. The wireless terminal of claim 46, wherein different numbers of guard subcarriers are included in said first and second portions of bandwidth.

48. The wireless terminal of claim 46, further comprising:
a guard subcarrier information recovery module for recovering received guard subcarrier information indicating both the number and location of guard subcarriers in said plaurality of discontinuous portions of bandwidth corresponding to the first carrier.

49. The wireless terminal of claim 48, further comprising:
a memory module for storing at least some of said received guard subcarrier information, said stored guard subcarrier information indicating different guard subcarrier locations within different discontinuous portions of bandwidth.

50. The wireless terminal of claim 46, wherein said discontinuous portions of bandwidth are separated by at least 1.25 MHz.

51. The wireless terminal of claim 50, wherein said resource is an uplink resource.

52. The wireless terminal of claim 51, further comprising:
wherein said symbol generation module is an OFDM symbol generation module which generates an OFDM symbol including information directed to said control node, said OFDM symbol including tones corresponding to said discontinuous portions but not said portion of bandwidth not included in said resource; and
a transmitter module for transmitting OFDM symbols generated by said OFDM symbol generation module.

53. The wireless terminal of claim 50, wherein said resource is a downlink resource.

54. A wireless terminal comprising:
receiver means for receiving, from a control node on a control channel formed from a group of contiguous subcarriers in bandwidth including at least some discontinuous subcarriers, guard subcarrier information, said guard subcarrier information indicating both the number and location of guard subcarriers in a plurality of discontinuous portions of bandwidth corresponding to a first carrier that may be assigned by said control node, and for receiving a resource assignment message indicating assignment, to said wireless terminal, of a resource including at least two discontinuous portions of bandwidth corresponding to the first carrier for a period of time, said at least two discontinuous portions of bandwidth being discontinuous portions of bandwidth from said plurality of discontinuous portions of bandwidth, said assignment message including a node identifier corresponding to a set of subcarriers including at least one guard subcarrier from each of the at least two discontinuous portions of bandwidth corresponding to the resource, said at least two discontinuous portions of bandwidth including a first portion of bandwidth and a second portion of bandwidth, said first and second portions of bandwidth being separated by a third portion of bandwidth corresponding to another carrier not included in said resource, said third portion of bandwidth being larger than either of said two discontinuous portions of bandwidth and being a portion of bandwidth which is not used by said control node; and
at least one of:
i) means for generating symbols corresponding to the allocated resource and
ii) means for recovering symbols corresponding to the allocated resource.

55. The wireless terminal of claim 54, wherein different numbers of guard subcarriers are included in said first and second portions of bandwidth.

56. The wireless terminal of claim 54, further comprising:
guard subcarrier information recovery means for recovering received guard subcarrier information indicating both the number and location of guard subcarriers in said plurality of discontinuous portions of bandwidth corresponding to the first carrier.

57. The wireless terminal of claim 56, further comprising:
memory means for storing at least some of said received guard subcarrier information, said stored guard subcarrier information indicating different guard subcarrier locations within different discontinuous portions of bandwidth.

58. The wireless terminal of claim 54, wherein said discontinuous portions of bandwidth are separated by at least 1.25 MHz.

59. An apparatus comprising:
a processor for use in a wireless terminal, the processor configured to:
receive, from a control node on a control channel formed from a group of contiguous subcarriers in bandwidth including at least some discontinuous subcarriers, guard subcarrier information, said guard subcarrier information indicating both the number and location of guard subcarriers in a plurality of discontinuous portions of bandwidth corresponding to a first carrier that may be assigned by said control node;
receive from said control node a resource assignment message indicating assignment, to said wireless terminal, of a resource including at least two discontinuous portions of bandwidth corresponding to the first carrier for a period of time, said at least two discontinuous portions of bandwidth being discontinuous portions of bandwidth from said plurality of discontinuous portions of bandwidth, said assignment message including a node identifier corresponding to a set of subcarriers including at least one guard subcarrier from each of the at least two discontinuous portions of bandwidth corresponding to the resource, said at least two discontinuous portions of bandwidth including a first portion of bandwidth and a second portion of bandwidth, said first and second portions of bandwidth being separated by a third portion of bandwidth corresponding to another carrier not included in said resource, said third portion of bandwidth being larger than either of said two discontinuous portions of bandwidth and being a portion of bandwidth which is not used by said control node; and
use said assigned resource to communicate with said control node.

60. The apparatus of claim 59, wherein different numbers of guard subcarriers are included in said first and second portions of bandwidth.

61. The apparatus of claim 59, wherein said processor is further configured to:
receive, as part of receiving said guard subcarrier information indicating both the number and location of guard subcarriers in said plurality of discontinuous portions of bandwidth, an allocation map identifying the number and location of guard subcarriers within portions of said bandwidth corresponding to the first carrier.

62. The apparatus of claim 59, wherein said discontinuous portions of bandwidth are separated by at least 1.25 MHz.

63. The apparatus of claim 62, wherein said processor is further configured to:
determine from the node identifier and stored information a set of sub-carriers corresponding to said node identifier to be used by said wireless terminal.

64. A non-transitory computer readable medium embodying machine executable instructions for controlling a wireless terminal to implement a method of communicating with another communications device, the method comprising:
receiving from a control node, on a control channel formed from a group of contiguous subcarriers in bandwidth including at least some discontinuous subcarriers, guard subcarrier information, said guard subcarrier information indicating both the number and location of guard subcarriers in a plurality of discontinuous portions of bandwidth corresponding to a first carrier that may be assigned by said control node;
receiving, from said control node, a resource assignment message indicating assignment, to said wireless terminal, of a resource including at least two discontinuous portions of bandwidth corresponding to the first carrier for a period of time, said assignment message including a node identifier corresponding to a set of subcarriers including at least one guard subcarrier from each of the at least two discontinuous portions of bandwidth corresponding to the resource, said at least two discontinuous portions of bandwidth including a first portion of bandwidth and a second portion of bandwidth, said first and second portions of bandwidth being separated by a third portion of bandwidth corresponding to another carrier not included in said resource, said third portion of bandwidth being larger than either of said two discontinuous portions of bandwidth and being a portion of bandwidth which is not used by said control node; and
using said assigned resource to communicate with said control node.

65. The non-transitory computer readable medium of claim 64, wherein different numbers of guard subcarriers are included in said first and second portions of bandwidth.

66. The non-transitory computer readable medium of claim 64,
wherein receiving guard subcarrier information indicating both the number and location of guard subcarriers in said plurality of discontinuous portions of bandwidth corresponding to the first carrier includes receiving an allocation map identifying the number and location of guard subcarriers within portions of said bandwidth corresponding to the first carrier.

67. The non-transitory computer readable medium of claim 64, wherein said discontinuous portions of bandwidth are separated by at least 1.25 MHz.

68. The non-transitory computer readable medium of claim 67, further embodying machine executable instructions for:
determining from the node identifier and stored information a set of sub-carriers corresponding to said node identifier to be used by said wireless terminal.

69. The method of claim 1,
wherein each of said at least two discontinuous portions of bandwidth is less than or equal to a first size; and
wherein each of said at least two discontinuous portions of bandwidth are separated by a portion of bandwidth which is spaced apart by an amount of bandwidth which is a multiple of said first size.

70. The method of claim 69, wherein said third portion of bandwidth is said first size.

71. The method of claim 69, further comprising: transmitting information indicating the total bandwidth over which said at least two discontinuous portions may be scattered.

72. The method of claim 71, wherein said total bandwidth is 2, 4, 8 or 16 times the first size.

73. The method of claim 71, wherein the total bandwidth is less than or equal to 20 MHz.

74. The method of claim 1, wherein said control node is one of a base station or access point, the method further comprising:

transmitting information indicating the total bandwidth over which said at least two discontinuous portions may be scattered.

\* \* \* \* \*